United States Patent
Costanzo et al.

(10) Patent No.: US 12,264,976 B2
(45) Date of Patent: Apr. 1, 2025

(54) INVERTER AND METHOD TO MEASURE JUNCTION TEMPERATURE FOR THERMAL PROTECTION

(71) Applicants: STMicroelectronics (Shenzhen) R&D Co., Ltd., Shenzhen (CN); STMicroelectronics (China) Investment Co., Ltd., Shanghai (CN)

(72) Inventors: Dino Costanzo, Catania (IT); Yan Zhang, Shanghai (CN); Guixi Sun, Shanghai (CN)

(73) Assignees: STMicroelectronics (Shenzhen) R&DCo., Ltd., Shenzhen (CN); STMicroelectronics (China) Investment Co., Ltd., Shanghai (CN)

( * ) Notice: Subject to any disclaimer, the term of this patent is extended or adjusted under 35 U.S.C. 154(b) by 440 days.

(21) Appl. No.: 17/836,817

(22) Filed: Jun. 9, 2022

(65) Prior Publication Data

US 2023/0400359 A1    Dec. 14, 2023

(51) Int. Cl.
*G01K 7/01* (2006.01)
*G01K 3/00* (2006.01)
*G01K 7/16* (2006.01)
*G01K 7/18* (2006.01)

(52) U.S. Cl.
CPC ............... *G01K 7/01* (2013.01); *G01K 3/005* (2013.01); *G01K 7/183* (2013.01)

(58) Field of Classification Search
CPC .......... G01K 7/01; G01K 3/005; G01K 7/183; G01K 7/16; G01K 3/00; G01K 7/18
See application file for complete search history.

(56) References Cited

U.S. PATENT DOCUMENTS 10,784,810 B1 * 9/2020 Lu .................... G01R 19/0092
2021/0172983 A1    6/2021 Costanzo et al.

FOREIGN PATENT DOCUMENTS

CN           211239733 U  *  8/2020  ........... G01R 15/146
WO     WO-2019008242 A1 *  1/2019  ......... H02M 7/53871

\* cited by examiner

*Primary Examiner* — Nathaniel T Woodward
*Assistant Examiner* — Julia Fitzpatrick
(74) *Attorney, Agent, or Firm* — Crowe & Dunlevy LLC

(57) ABSTRACT

A three-phase load is powered by an SPWM driven inverter having a single shunt-topology. During operation, drain-to-source resistances of transistors of each branch of the inverter are determined. Interpolation is performed on assumed drain-to-source resistances of the transistors for different temperatures to produce a non-linear model of drain-to-source resistance to temperature for the transistors, and the drain-to-source resistances determined during operation and the non-linear model are used to estimate temperature values of the transistors. Driving of the inverter can be adjusted so that conductivity of each branch is set so that power delivered by that branch is as high as possible without exceeding an allowed drain current threshold representing a threshold junction temperature. In addition, driving of the inverter can be ceased if the temperature of a transistor exceeds the threshold temperature.

18 Claims, 11 Drawing Sheets

INVERTER AND METHOD TO MEASURE JUNCTION TEMPERATURE FOR THERMAL PROTECTION

TECHNICAL FIELD

This disclosure relates in general to inverters for driving three phase electric machines and, in particular, to a method for protecting the transistors of those inverters from thermal stresses based upon estimated junction temperatures of those transistors.

BACKGROUND

In a three-phase electric device, such as a three-phase motor drive by a three-phase inverter, it is desired to know the temperatures of the power devices of the electric machine so as to be able to modify operation of those power devices to provide them with protection from thermal stresses.

This may be performed through the use of thermal sensors within the case carrying the three-phase electric device. However, these sensors cannot provide a measurement of junction temperature within each power device of the three-phase electric device, which changes more rapidly than the temperatures within the case near each power devices. Additionally, the precision of this temperature measurement is affected by the position of the temperature sensors, heat originating from other sources, layout of the circuits of the electric machine, and the load balancing. Imprecision due to imbalance of the load can be of particular concern where a single temperature sensor within the case is utilized, despite there being multiple power devices within the three-phase electric device—imbalance can lead to the temperature of the power devices being different from one another, and the temperature data provided by the single temperature sensor may not reflect the additional danger to the power device with the highest junction temperature.

Another way to determine the temperatures of the power devices within an electric machine relies on calculating the drain-to-source resistance (RDSon) of those power devices and combining it with data from a temperature sensor within the case to form an estimation of junction temperature. However, this is dependent on the precision of the calculation of RDSon, and RDSon itself changes with junction temperature.

As such, further development into techniques that permit accurate estimation of the junction temperature of the power devices within a three-phase electronic device, both in terms of precision and in response time, is needed.

SUMMARY

In an inverter that utilizes multiple power devices, maintaining the stability of the power devices is desirable for robustness of the operation of the inverter because thermal stresses may damage those power devices. Disclosed herein is a technique in which calibrated drain-to-source resistances (RDSon) of the power devices can be determined over a range of temperatures, and then used to estimate the junction temperature of the power devices during operation. From this estimated junction temperatures, the drain currents within the power devices can be limited on the fly to enable the power devices to continuously deliver the highest potentials they are safely capable of delivering, across the range of operating temperatures.

Disclosed herein is an electric device including an inverter system to be coupled to phase windings of an electric machine to drive the electric machine. The inverter system includes switching branches coupled between a DC supply voltage node and an intermediate node, with each of the switching branches having a terminal to be coupled to a respective phase winding of the electric machine. A shunt resistor is coupled between the intermediate node and ground. Control circuitry is configured to apply control signals in accordance with a control scheme to the switching branches to cause the inverter to drive the phase windings of the electric machine with a multi-phase AC power signal.

The control scheme is divided into sectors, with each sector being divided into periods. The control circuitry is configured to, during at least some sectors of the control scheme: during a first given period: measure a shunt voltage across the shunt resistor; and measure a drain to source voltage of a first calibration transistor, the first calibration transistor being a transistor of a given switching branch; and determine a drain to source resistance of the first calibration transistor as a function of a resistance of the shunt resistor, the drain to source voltage of the first calibration transistor measured during the first given period, and the shunt voltage measured during the first given period.

The control circuitry is further configured to control driving of the given switching branch, determine a temperature of the first calibration transistor during driving of the electric machine by the inverter system based upon the drain to source resistance of the first calibration transistor, modify driving of the given switching branch so as to maintain conductivity of the first calibration transistor at a highest level at which the temperature of the first calibration transistor remains below a threshold temperature, and cease driving of the given switching branch when the temperature of the first calibration transistor exceeds the threshold temperature.

The control circuitry may be further configured to, during a calibration phase, perform an interpolation on assumed values of the drain to source resistance of the first calibration transistor for given temperature values of the first calibration transistor to thereby generate a non-linear model of drain to source resistance to temperature for the first calibration transistor. The control circuitry may determine the temperature of the first calibration transistor using the non-linear model and the drain to source resistance of the first calibration transistor.

The control circuitry may be further configured to, during the calibration phase, normalize the assumed values of the drain to source resistance of the first calibration transistor prior to performing the interpolation.

A case may carry at least the switching branches and the shunt resistor, with a temperature sensor being positioned within the case. The control circuitry may be further configured to, during the calibration phase: read temperature of an interior of the case from the temperature sensor; determine, from the assumed values of the drain to source resistance of the first calibration transistor for the given temperature values of the first calibration transistor, an expected drain to source resistance of the first calibration transistor for the read temperature; determine a ratio between the drain to source resistance of the first calibration transistor and the expected drain to source resistance of the first calibration transistor; and use the determined ratio to calibrate the assumed values of the drain to source resistance of the first calibration transistor for the given temperature values of the first calibration transistor prior to performing the interpolation such that the interpolation is performed on the calibrated assumed values of the drain to source resistance of the first calibration transistor for the given temperature values of the first calibration transistor.

The control circuitry may be further configured to, during the calibration phase, normalize the assumed values of the drain to source resistance of the first calibration transistor prior to determining the expected drain to source resistance of the first calibration transistor for the read temperature.

The interpolation may produce a second order non-linear model representing relation between drain to source resistance to temperature for the first calibration transistor.

The electric machine may have first, second, and third phase windings. The switching branches may include a first switching branch coupled between the DC supply voltage node and the intermediate node, the first switching branch having a first terminal to be coupled to the first phase winding, a second switching branch coupled between the DC supply voltage node and the intermediate node, the second switching branch having a second terminal to be coupled to the second phase winding, and a third switching branch coupled between the DC supply voltage node and the intermediate node, the third switching branch having a third terminal to be coupled to the third phase winding. The control scheme may be a space vector pulse width modulation (SVPWM) scheme, with the sectors being six in number, with each of the six sectors being divided into a plurality of periods.

The multi-phase AC power signal may be a three phase AC power signal. The control circuitry may apply the control signals in accordance with the SVPWM scheme to the first, second, and third switching branches to cause the inverter to drive the first, second, and third phase windings of the electric machine with the three phase AC power signal.

The first given period may be the second period of at least some sectors of the SVPWM scheme. The control circuitry may be configured to, during at least some sectors of the SVPWM scheme: during a fourth period: measure the drain to source voltage of the first calibration transistor; and measure a drain to source voltage of a measured transistor, the measured transistor being a transistor of a next switching branch;

The control circuitry may be further configured to, during at least some sectors of the SVPWM scheme: determine a phase current of a given phase winding coupled to the given switching branch as a function of the drain to source voltage of the first calibration transistor measured during the fourth period and the drain to source resistance of the first calibration transistor; determine a phase current a next phase winding coupled to the next switching branch as a function of the drain to source voltage of the measured transistor measured during the fourth period and a drain to source resistance of the measured transistor known from a prior sector of the SVPWM scheme; and determine a phase current of a remaining phase winding coupled to the remaining switching branch as a function of the phase current of the given phase winding and the phase current of the next phase winding.

The control circuitry may control the driving of the first, second, and third switching branches based upon the phase current of the given phase winding, the phase current of the next phase winding, and the phase current of the remaining phase winding. The control circuitry may be further configured to: determine a temperature of the measured transistor during driving of the electric machine by the inverter system based upon the drain to source resistance of the measured transistor; modify driving of the next switching branch so as to maintain conductivity of the measured transistor at a highest level at which the temperature of the measured transistor remains below the threshold temperature; and cease driving of the next switching branch when the temperature of the measured transistor exceeds the threshold temperature.

The first calibration transistor may be a low-side transistor of the given switching branch, and the measured transistor may be a low-side transistor of the next switching branch.

The control circuitry may determine the drain to source resistance of the first calibration transistor as:

$$Rds(\text{Calibration Transistor}) = \frac{Rshunt * V1phase2}{Vshunt2}$$

where Rshunt is the resistance of the shunt resistor, V1phase2 is the drain to source voltage of the first calibration transistor measured during the second period, and Vshunt2 is the shunt voltage measured during the second period.

The control circuitry may determine the phase current of the given phase winding as:

$$I\text{phase1} = V1\text{phase4}/Rds(\text{Calibration Transistor})$$

where V1phase4 is the drain to source voltage of the first calibration transistor measured during the fourth period, and Rds(Calibration Transistor) is the drain to source resistance of the first calibration transistor.

The control circuitry may determine the phase current of the next phase winding as:

$$I\text{phase2} = V2\text{phase4}/Rds(\text{Measured Transistor})$$

where V2phase4 is the drain to source voltage of the measured transistor measured during the fourth period, and Rds(Measured Transistor) is the drain to source resistance of the measured transistor known from a prior SVPWM sector.

The control circuitry may determine the phase current of the remaining phase winding as:

$$I\text{phase3} = -(I\text{phase1} + I\text{phase2}).$$

Also disclosed herein is an inverter system to be coupled to three phase windings of an electric machine. The inverter system includes: a first switching branch coupled between a DC supply voltage node and an intermediate node, the first switching branch having a first terminal to be coupled to a first phase winding of the electric machine; a second switching branch coupled between the DC supply voltage node and the intermediate node, the second switching branch having a second terminal to be coupled to a second phase winding of the electric machine; a third switching branch coupled between the DC supply voltage node and the intermediate node, the third switching branch having a third terminal to be coupled to a third phase winding of the electric machine; and a shunt resistor coupled between the intermediate node and ground.

Control circuitry is configured to apply control signals in accordance with a space vector pulse width modulation (SVPWM) scheme to the first, second, and third switching branches to drive the first, second, and third phase windings of the electric machine with an three phase AC power signal. The SVPWM scheme is divided into six sectors, with each sector being divided into a plurality of periods comprising first, second, third, and fourth periods.

The control circuitry is configured to, during at least some sectors of the SVPWM scheme, during the second period of the plurality of periods: measure a shunt voltage across the shunt resistor; and measure a drain to source voltage of a first calibration transistor, the first calibration transistor being a transistor of a given switching branch.

The control circuitry is further configured to, during at least some sectors of the SVPWM scheme, during the third period of the plurality of periods: measure a shunt voltage across the shunt resistor: measure a drain to source voltage of a second calibration transistor, the second calibration transistor being a transistor of a next switching branch; and measure the drain to source voltage of the first calibration transistor.

The control scheme is further configured to, during at least some sectors of the SVPWM scheme, during the fourth period of the plurality of periods: measure the drain to source voltage of the first calibration transistor; measure the drain to source voltage of the second calibration transistor; and measure a drain to source voltage of a measured transistor, the measured transistor being a transistor of a remaining switching branch.

The control circuitry is further configured to, during at least some sectors of the SVPWM scheme: determine a drain to source resistance of the first calibration transistor as a function of a resistance of the shunt resistor, the drain to source voltage of the first calibration transistor measured during the second period, and the shunt voltage measured during the second period; determine a drain to source resistance of the second calibration transistor as a function of a resistance of the shunt resistor, the drain to source resistance of the first calibration transistor, the drain to source voltage of the first calibration transistor measured during the fourth period, the drain to source voltage of the second calibration transistor measured during the fourth period, and the shunt voltage measured during the fourth period: determine a phase current of a given phase winding coupled to the given switching branch as a function of the drain to source voltage of the first calibration transistor measured during the fourth period and the drain to source resistance of the first calibration transistor; determine a phase current of a next phase winding coupled to the next switching branch as a function of the drain to source voltage of the second calibration transistor measured during the fourth period and the drain to source resistance of the second calibration transistor; and determine a phase current of a remaining phase winding coupled to the remaining switching branch as a function of the phase current of the given phase winding and the phase current of the next phase winding.

The control circuitry is further configured to: control driving of the first, second, and third switching branches based upon the phase current of the given phase winding, the phase current of the next phase winding, and the phase current of the remaining phase winding; determine a temperature of the first calibration transistor during driving of the electric machine by the inverter system based upon the drain to source resistance of the first calibration transistor; modify driving of the given switching branch so as to maintain conductivity of the first calibration transistor at a highest level at which the temperature of the first calibration transistor remains below a threshold temperature; cease driving of the given switching branch when the temperature of the first calibration transistor exceeds the threshold temperature; determine a temperature of the measured transistor during driving of the electric machine by the inverter system based upon the drain to source resistance of the measured transistor; modify driving of the next switching branch so as to maintain conductivity of the measured transistor at a highest level at which the temperature of the measured transistor remains below the threshold temperature; and cease driving of the next switching branch when the temperature of the measured transistor exceeds the threshold temperature.

The control circuitry may be further configured to, during a calibration phase, perform an interpolation on assumed values of the drain to source resistance of the first calibration transistor for given temperature values of the first calibration transistor to thereby generate a non-linear model of drain to source resistance to temperature for the first calibration transistor. The control circuitry may determine the temperature of the first calibration transistor using the non-linear model and the drain to source resistance of the first calibration transistor.

The control circuitry may be further configured to, during the calibration phase, normalize the assumed values of the drain to source resistance of the first calibration transistor prior to performing the interpolation.

A case may carry at least the first, second, and third switching branches and the shunt resistor, with a temperature sensor being positioned within the case. The control circuitry may be further configured to, during the calibration phase, read temperature of an interior of the case from the temperature sensor; determine, from the assumed values of the drain to source resistance of the first calibration transistor for the given temperature values of the first calibration transistor, an expected drain to source resistance of the first calibration transistor for the read temperature; determine a ratio between the drain to source resistance of the first calibration transistor and the expected drain to source resistance of the first calibration transistor; and use the determined ratio to calibrate the assumed values of the drain to source resistance of the first calibration transistor for the given temperature values of the first calibration transistor prior to performing the interpolation such that the interpolation is performed on the calibrated assumed values of the drain to source resistance of the first calibration transistor for the given temperature values of the first calibration transistor.

The control circuitry may be further configured to, during the calibration phase, normalize the assumed values of the drain to source resistance of the first calibration transistor prior to determining the expected drain to source resistance of the first calibration transistor for the read temperature.

The interpolation may produce a second order non-linear model representing relation between drain to source resistance to temperature for the first calibration transistor.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 1A:
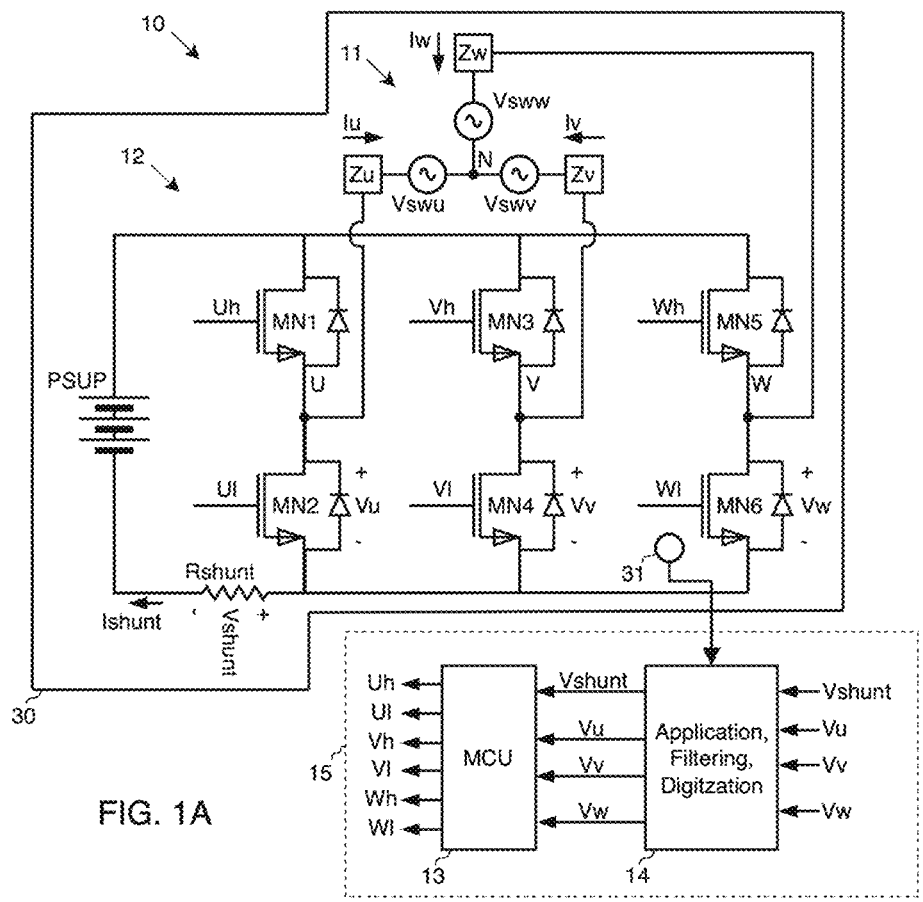
FIG. 1A is a block diagram of an electric machine which can employ the techniques described herein.

A power system 10 disclosed herein includes a three-phase inverter bridge 12 powering an electric machine 11 (e.g., an electric motor), as shown in FIG. 1A. The three-phase inverter bridge 12 includes six power switches (n-channel transistors) MN1, MN2, MN3, MN4, MN5, and MN6. Disclosed herein are techniques for determining the drain to source resistance RDS of these transistors MN1-MN6 of the bridge 12 during operation, utilizing the determinations of RDS to determine the temperature of those transistors, and, knowing the temperature of the transistors on the fly, modifying inverter operation of the bridge 12 on the fly to protect the transistors from thermal stresses while delivering the highest amount of power that the transistors are capable of given current operating conditions.

Returning now to the description of the power system 10, although n-channel MOSFETS are shown in FIG. 1A, the power system 10 may utilize any suitable power switching devices provided that the voltage drop across the power switching devices is a function of the current flowing through the power switching devices.

In particular, n-channel transistor MN1 has its drain coupled to a supply voltage Vcc, its source coupled to terminal U, and its gate coupled to receive control signal Uh; and n-channel transistor MN2 has its drain coupled to the terminal U, its source coupled to a first terminal of the common shunt resistor Rshunt, and its gate coupled to receive control signal Ul. N-channel transistor MN3 has its drain coupled to the supply voltage Vcc, its source coupled to terminal V, and its gate coupled to receive the control signal Vh; and n-channel transistor MN4 has its drain coupled to the terminal V, its source coupled to the first terminal of the common shunt resistor Rshunt, and its gate coupled to receive the control signal Vl. N-channel transistor MN5 has its drain coupled to the supply voltage Vcc, its source coupled to terminal W, and its gate coupled to receive the control signal Wh; and n-channel transistor MN6 has its drain coupled to the terminal W, its source coupled to the first terminal of the common shunt resistor Rshunt, and its gate coupled to receive the control signal Wl.

Three impedance elements Zu, Zv, and Zw are respectively between the terminals U, V, and W of the three-phase inverter bridge 12 and voltage sources Vswu, Vswv, and Vsww. The voltage sources Vswu, Vswv, and Vsww are coupled to one another at a central node N. The impedance elements Zu, Zv, and Zw and the voltage sources Vswu, Vswv, and Vsww represent an equivalent circuit of three phase windings of an electric machine 11 configured as a Wye connected load driven by the three-phase inverter bridge 12, in which phase currents Iu, Iv, and Iw flow.

A single common current sensing resistor Rshunt is connected between the sources of n-channel transistors MN2, MN4, and MN6 and ground, and therefore functions to sense the DC current Ishunt that is returned to the power supply PSUP.

Phase currents are assumed to be positive when flowing from the terminals U, V, and W to the phase windings, and the DC current Ishunt is assumed to be positive when flowing toward ground.

Complementary pulse width modulation (PWM) signals Uh, Ul, and Vh, Vl, and Wh, Vl control the high side transistor and the low side transistor of each leg of the three-phase bridge 12 (i.e., MN1, MN2, and MN3, MN4, and MN5, MN6, respectively), with dead time insertions to exclude risks of simultaneous turned-on states of the two transistors of a given leg of the three-phase bridge 12 that could result in a potentially damaging short-circuit.

The inductive character of the electric machine 11 load and the consequent phase lag between current and voltage could cause an unrecoverable reduction of the resulting peak-to-peak voltage of the 120° electrically out-phased voltage waveforms that are produced on the phase windings Zu, Zv, Zw when driven by the respective PWM signals Uh, Ul, and Vh, Vl, and Wh, Wl.

The amplification/filtering/digitization block 14 receives as feedback the voltage Vshunt across the resistor Rshunt, the drain to source voltage Vu of MN2, the drain to source voltage Vv of MN4, and the drain to source voltage Vw of MN6, conditions these signals, and passes them in conditioned form to the microcontroller 13. The microcontroller 13 generates the control signals Uh, Ul for MN1-MN2, Vh, Vl for MN3-MN4, and Wh, Wl for MN5-MN6. Note that in some instances, the amplification and/or filtering may be optional. The amplification/filtering/digitization block 14 and microcontroller 13 are part of control circuitry 15.

The method and techniques described herein are for the case of determining the phase currents Iu, Iv, Iw of the electric machine 11 powered by the three-phase bridge 12 controlled by space vector pulse width modulation (SVPWM). However, the disclosed techniques are applicable to any electric machine powered by a three-phase inverter controlled by any PWM scheme.

For each configuration of the low-side transistors MN2, MN4, MN6 of the three legs of the three-phase bridge 12, the current that flows in the shunt resistor Rshunt connected between the sources of MN2, MN4, and MN6 and ground is indicated in Table 1 below.

| Ul (MN2) | Vl (MN4) | Wl (MN6) | Ishunt |
|---|---|---|---|
| 0 (Open) | 0 (Open) | 0 (Open) | 0 |
| 0 (Open) | 1 (Closed) | 1(Closed) | Iu |
| 0 (Open) | 0 (Open) | 1(Closed) | −Iw |
| 1(Closed) | 0 (Open) | 1(Closed) | Iv |
| 1(Closed) | 0 (Open) | 0 (Open) | −Iu |
| 1(Closed) | 1(Closed) | 0 (Open) | Iw |
| 0 (Open) | 1(Closed) | 0 (Open) | −Iv |

As understood to those of skill in the art, SVPWM is a modulation scheme used to apply a given voltage vector to an electric machine by switching the transistors MN1-MN6 of the three-phase bridge 12 in the different configurations in the above chart for different periods of time to emulate a three-phase sinusoidal waveform (the "space vector", which is simply the vector sum of the three phase voltages Vu, Vv, Vw produced by the three-phase bridge 12 when modulated according to SVPWM).

Figure 2:
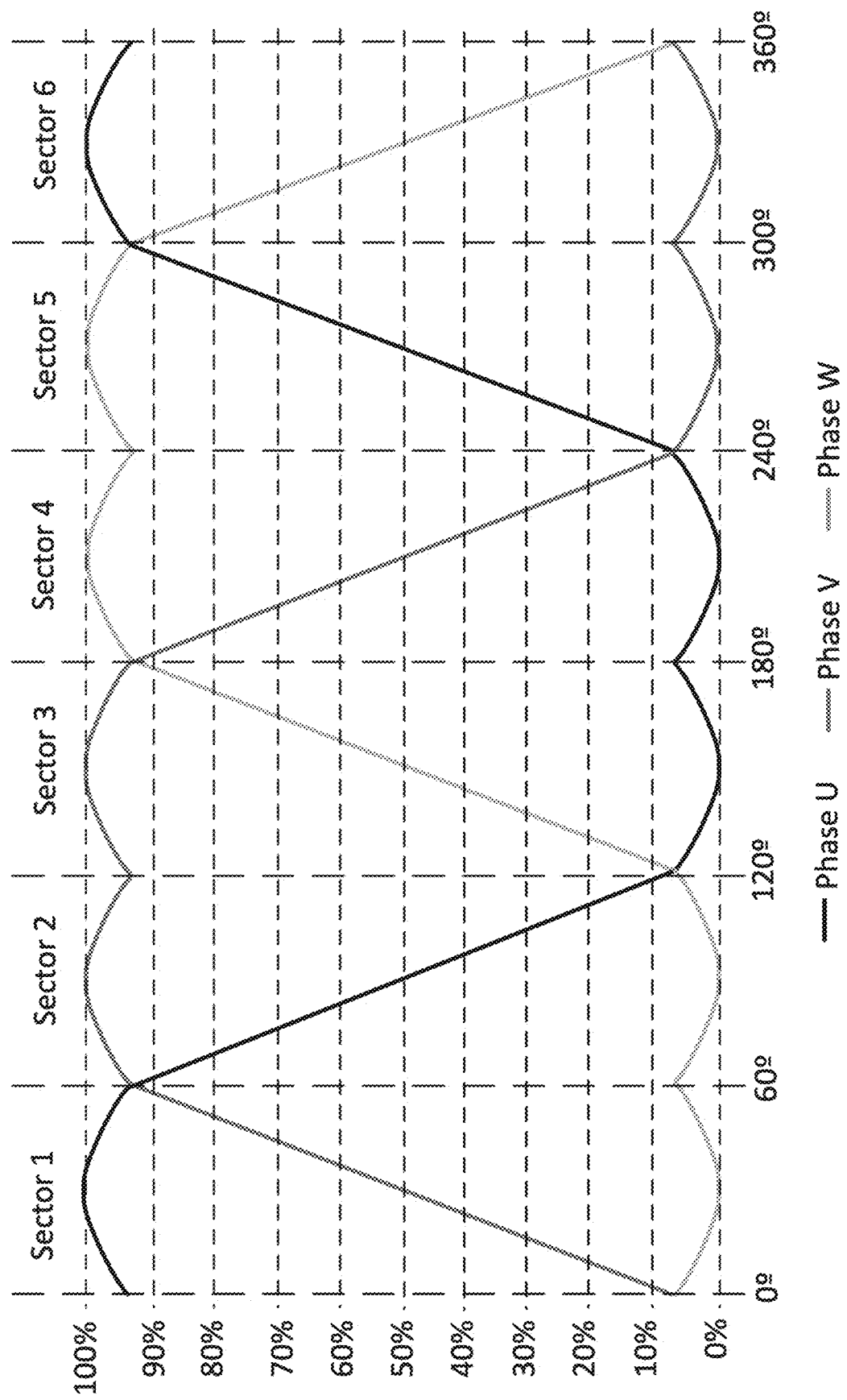
FIG. 2 is a graph of a six sector space vector for use in space vector pulse width modulation (SVPWM).
Figure 3A:
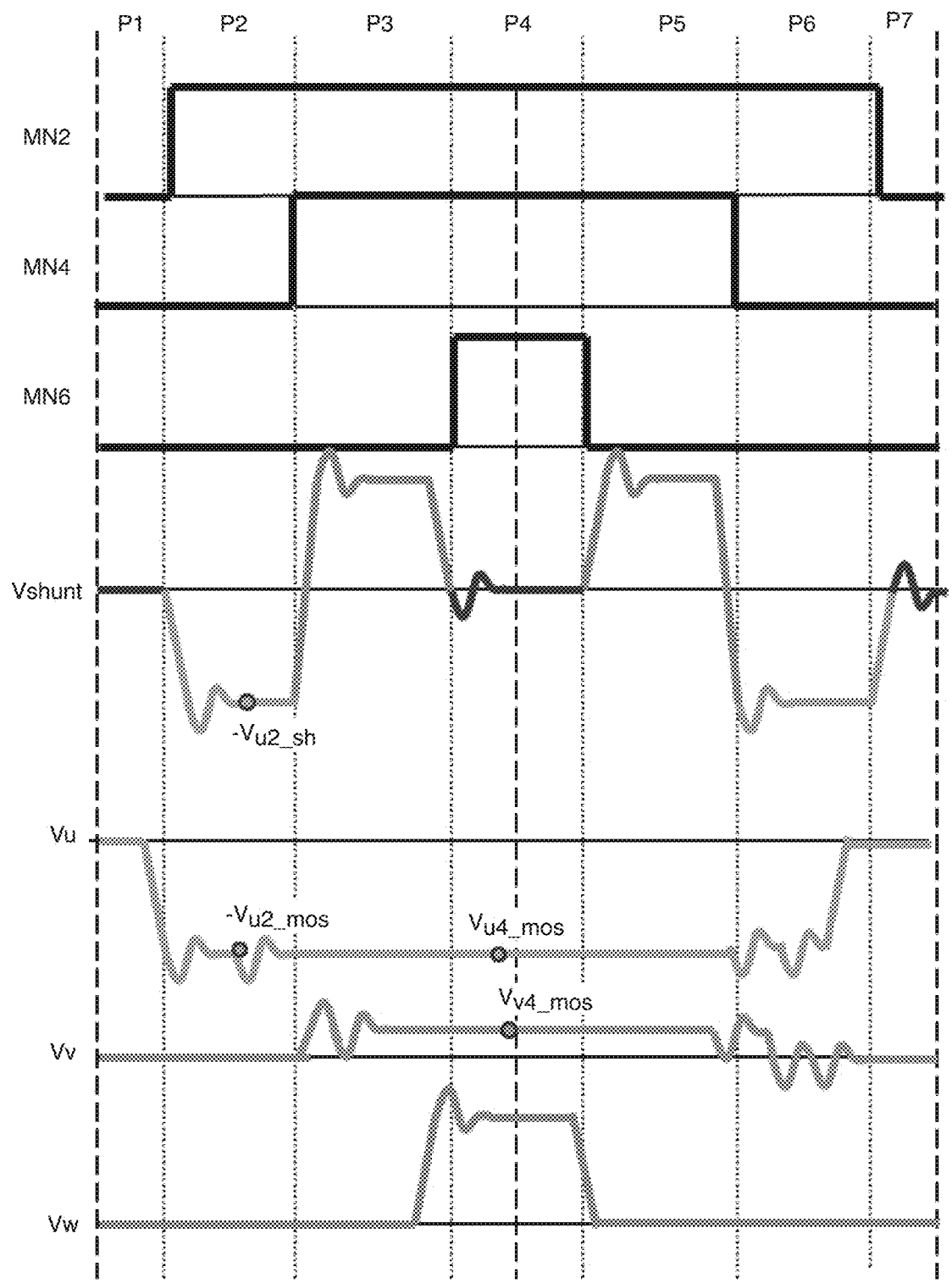
FIGS. 3A-3F are graphs showing operation of the three-phase inverter of the power system of FIG. 1A during the six sectors of SVPWM, and showing sampling points for performing a first phase current determination technique described herein used to calculate the drain-to-source resistances of the transistors of the inverter of FIG. 1A.
Figure 3B:
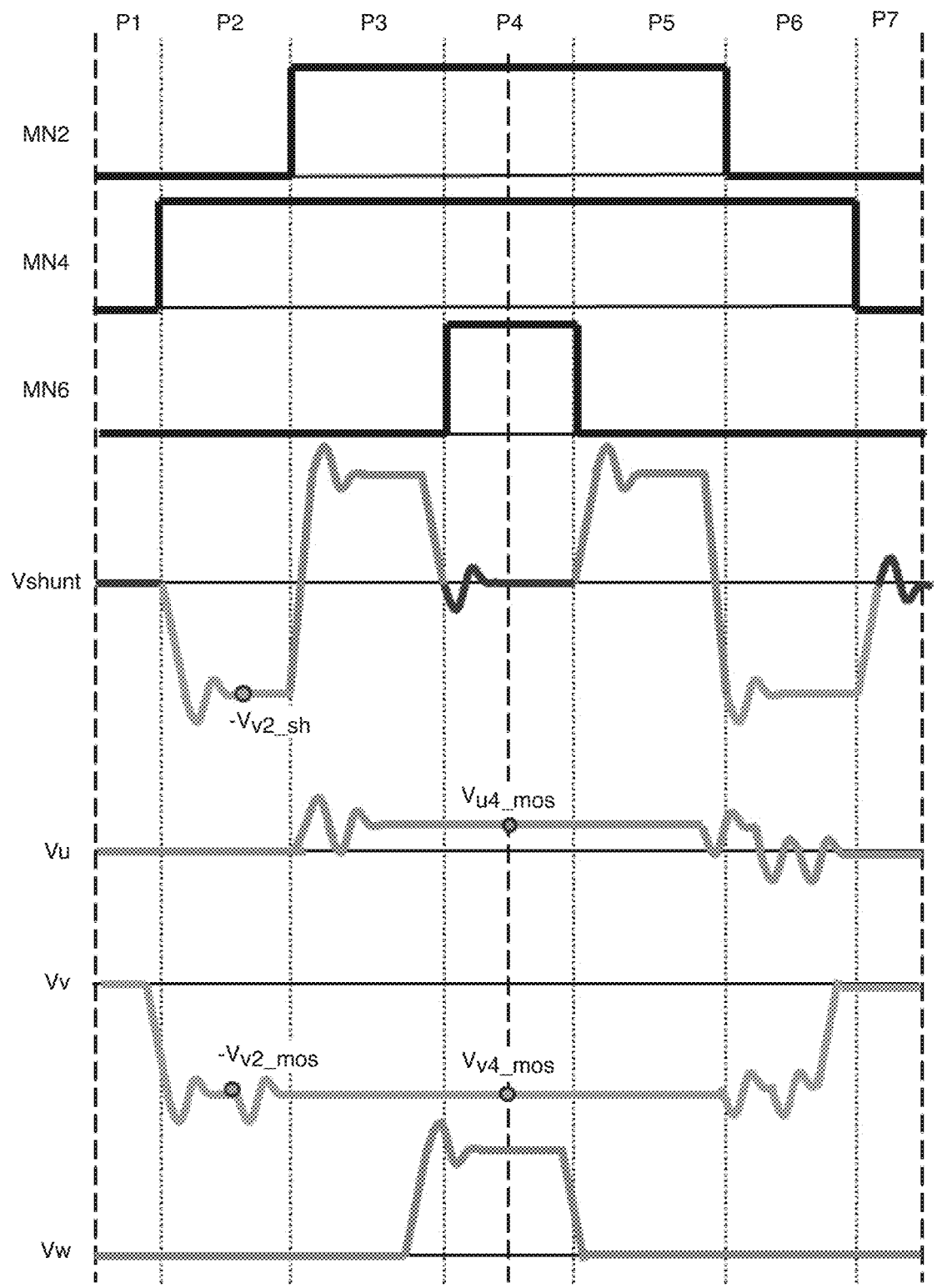
Figure 3C:
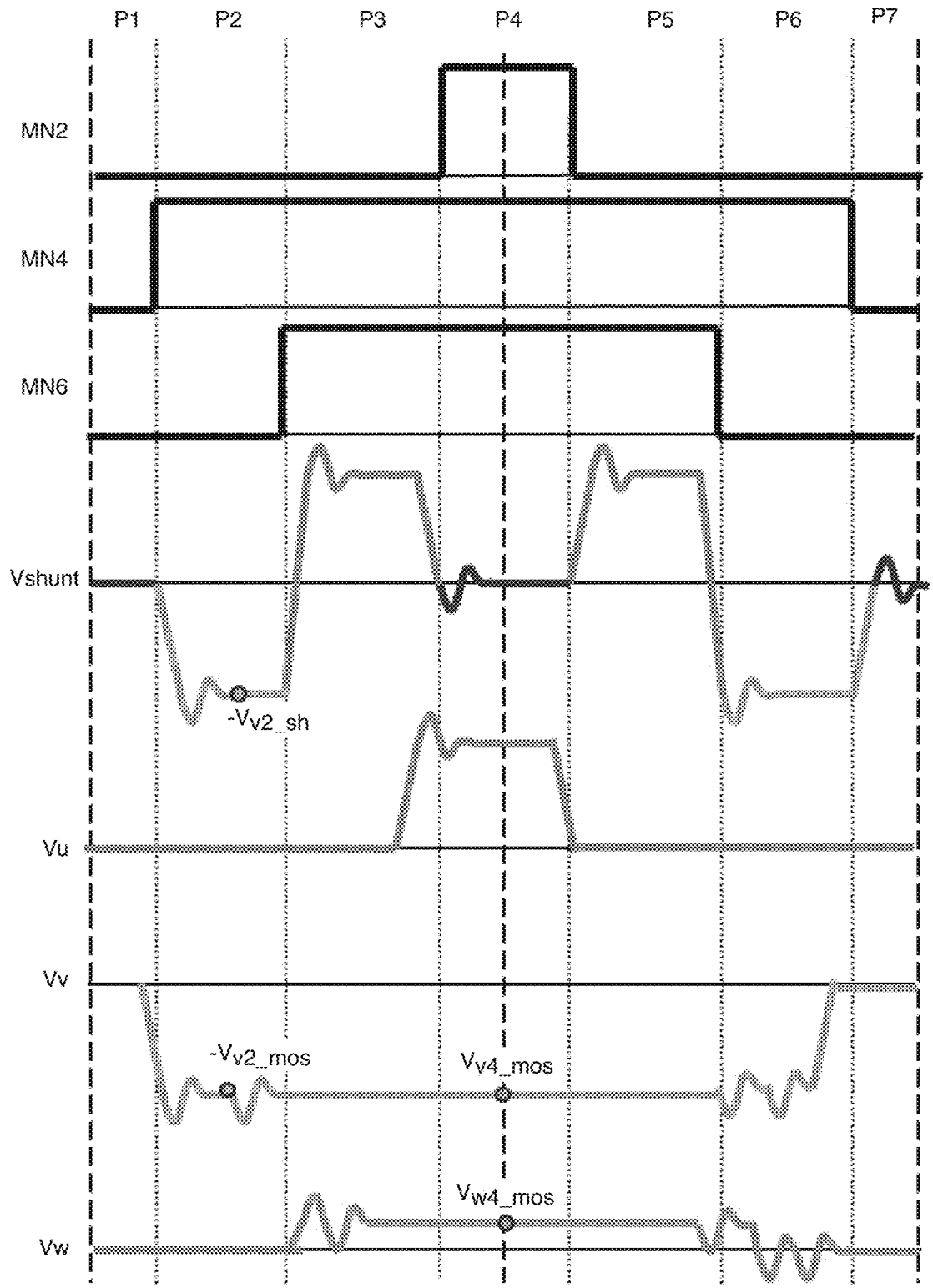
Figure 3D:
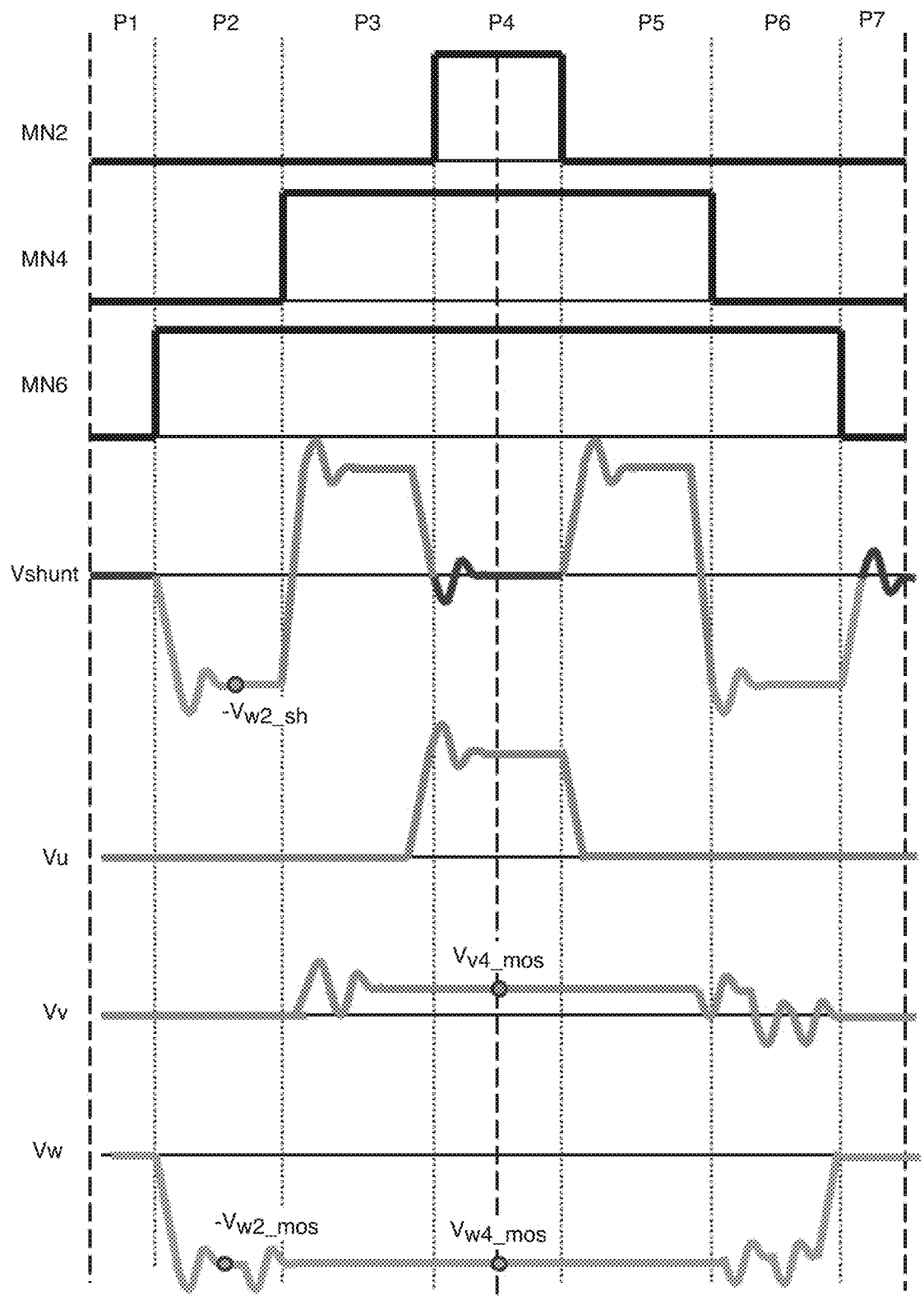
Figure 3E:
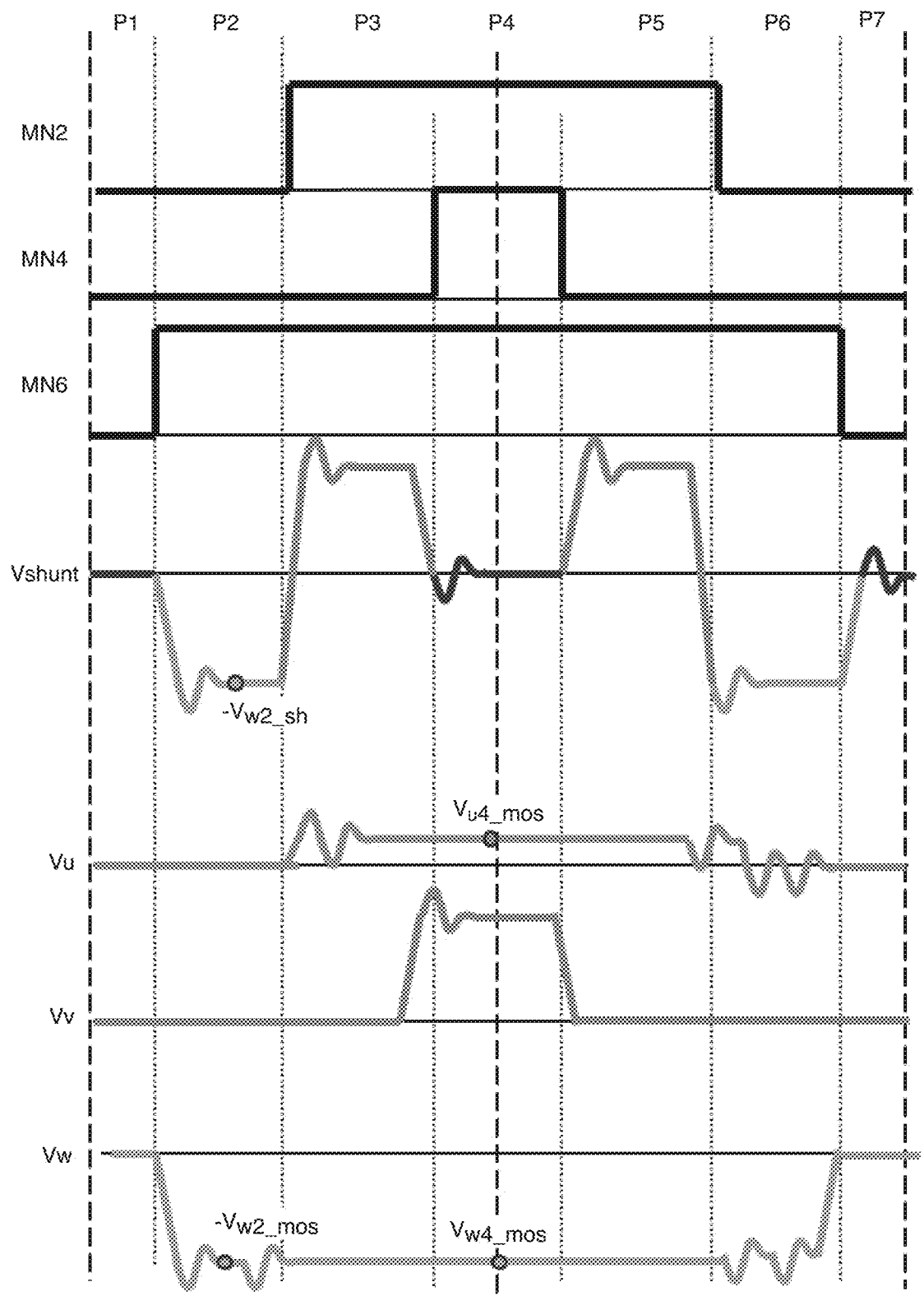
Figure 3F:
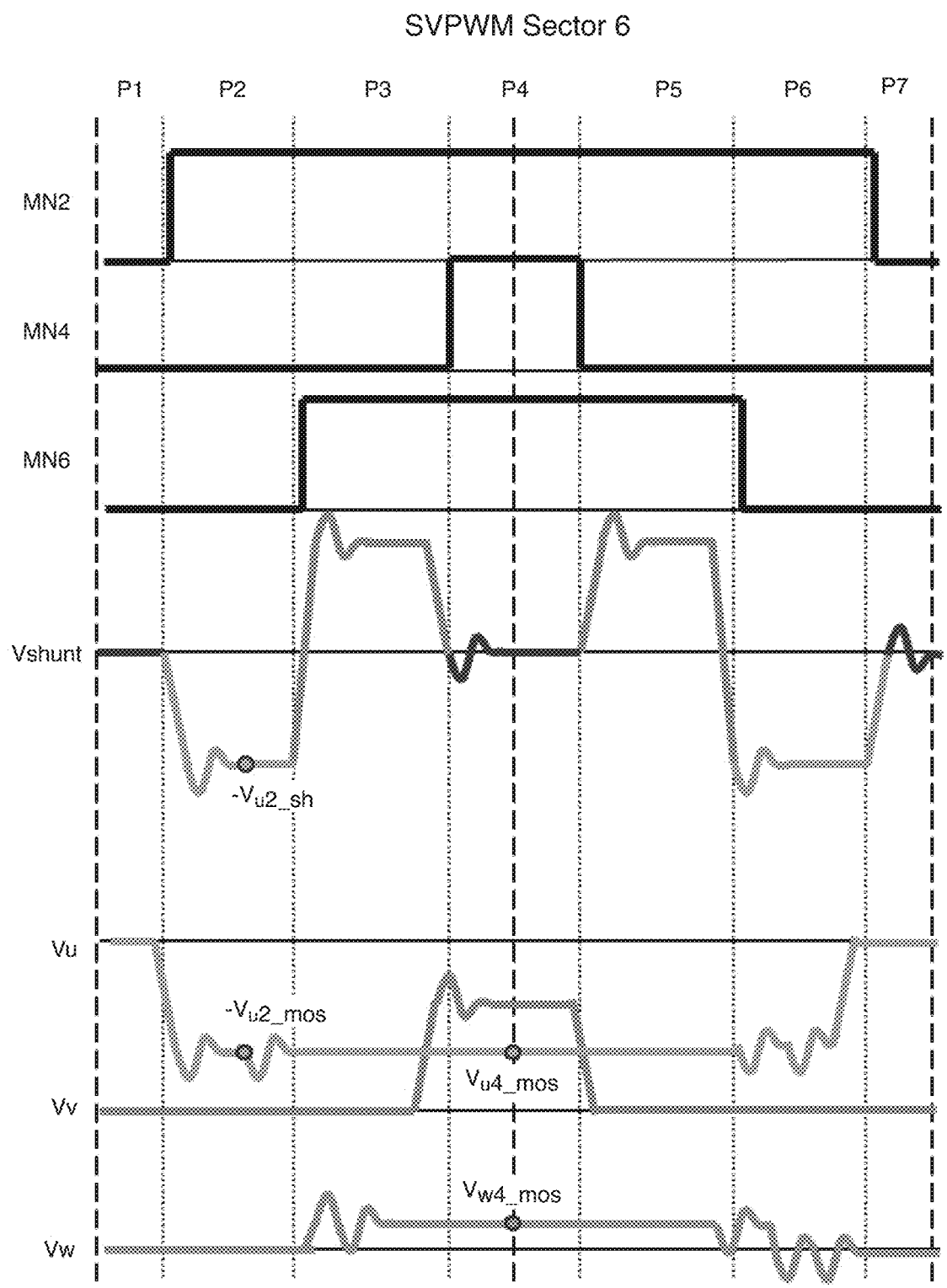

As also understood to those of skill in the art, one full cycle of SVPWM modulation is divided into six "sectors". The space vector used can be seen in graphical form in FIG. 2. As will be seen, each sector contains seven periods.

Described herein are techniques for accurately determining the phase currents Iu, Iv, Iw of the three-phase bridge 12 using the single shunt Rshunt topology three-phase bridge 12. From these determined phase currents (which are used as feedback), the microcontroller 13 may in some cases generation of the control signals Uh, Ul for MN1-MN2, Vh, Vl for MN3-MN4, and Wh, Wl for MN5-MN6 to as to control the electric machine 11 and enhance operation of the electric machine 11.

First Technique for Phase Current Determination (for High Electric Machine Speed)

A first technique will now be described with reference to FIGS. 3A-3F. Note that the technique described with reference to FIGS. 3A-3F is particularly useful for the case where the speed of the electric machine is high. In general, this technique works by measuring Vshunt and one of the voltages Vu, Vv, Vw during the second period of each sector of the SVPWM, and from those two measured voltages calculating the drain to source resistance of the transistor across which the voltage Vu, Vv, or Vw was measured (e.g., MN2, MN4, MN6)—this drain to source resistance can be referred to as the calibrated drain to source resistance (of the sample of that transistor at that instant in time, that takes into accounts the various conditions which may effect the drain to source resistance, such as temperature, gate current, drain current, etc.) for that sector of the SVPWM, and the corresponding transistor can be referred to as the calibrated transistor. Then, during the fourth period of each sector of the SVPWM, the voltage Vu, Vv, or Vw that was measured during the second period is measured again, and one of the other voltages Vu, Vv, or Vv across a corresponding transistor (e.g., MN2, MN4, MN6) is measured. The transistors corresponding to the voltages read during the fourth period of each sector of the SVPWM can be referred to as the read transistors.

Using the calibrated drain to source resistance and the voltage that was measured again during the fourth period of that sector of the SVPWM, the phase current (flowing through the calibrated transistor) is calculated. Then, using the voltage that was measured across the other read transistor during the fourth period, and the drain to source resistance across that read transistor (that was calculated during a prior sector of the SVPWM), the phase current (flowing through that read transistor) is calculated. Finally, since the sum of the phase currents is known to be zero, from the two calculated phase currents for that sector of the SVPWM, the other phase current can be calculated.

Therefore, this first technique can be briefly summed up by the following steps which are performed for each SVPWM sector:
1. Measure Vshunt and a phase voltage (Vu, Vv, or Vw) corresponding to voltage across the transistor to be calibrated, during second period of the SVPWM sector.
2. Calculate the calibrated drain to source resistance RDS of the calibrated transistor (MN2, MN4, or MN6) as:

$$Rds(\text{Calibrated Transistor}) = \frac{Rshunt * Vphase2}{Vshunt2}$$

where "calibrated transistor" is the transistor being calibrated during that sector of the SVPWM, "Rshunt" is the resistance of the resistor Rshunt, "Vshunt2" is the voltage across Rshunt during the second period of that sector of the SVPWM, and "Vphase2" is the voltage across the calibrated transistor during the second period of that sector of the SVPWM.

3. Measure the voltage across the calibrated transistor and a voltage across another of the transistors (MN2, MN4, or MN6), during the fourth period of the SVPWM sector.

4. Calculate the phase current for the calibrated transistor as:

$I\text{phase(Calibrated Transistor)}=V\text{phase4}/Rds(\text{Calibrated Transistor})$ where "calibrated transistor" is the transistor that was calibrated during the sector of the SVPWM, and "Vphase4" of the voltage across the calibrated transistor during the fourth period of the sector of the SVPWM.

5. Calculate the phase current for the read transistor (other than the calibrated transistor) across which the voltage was measured during Step 3 as:

$I\text{phase(Read Transistor)}=V(\text{Read Transistor})/Rds(\text{Read Transistor})$ where "Read Transistor" is the transistor other than the calibrated transistor across which the voltage was measured during Step 3, where "V(Read Transistor)" is the voltage across the "Read Transistor" as measured during Step 3, and where "Rds(Read Transistor)" is the drain to source resistance of the "Read Transistor" calculated during a previous sector of the SVPWM when that sector was calibrated.

6. Calculate the phase current for the remaining transistor as:

$I\text{other}=-[I\text{phase(Calibrated Transistor)}+I\text{phase(Read Transistor)}]$ Note that the values measured during the second period of the SVPWM sectors are to be measured simultaneously, substantially simultaneously, or as close together in time as possible (for example, 1 μs or less; the power the inductance of the electric machine 10 and the higher the DC voltage VCC). This measurement involves the digitization of the measured values by the amplification/filtering/digitization block 14, and these values may be sampled once to produce the digitized versions thereof, or may be sampled multiple times and those samples averaged, filtered, dithered, etc., to produce the digitized versions.

In addition, the values measured during the third period of the SVPWM sectors are to be measured simultaneously, substantially simultaneously, or as close together in time as possible. This measurement involves the digitization of the measured values by the amplification/filtering/digitization block 14, and these values may be sampled once to produce the digitized versions thereof, or may be sampled multiple times and those samples averaged, filtered, dithered, etc., to produce the digitized versions.

The values measured during the fourth period of the SVPWM sectors are to be measured simultaneously, substantially simultaneously, or as close together in time as possible. This measurement involves the digitization of the measured values by the amplification/filtering/digitization block 14, and these values may be sampled once to produce the digitized versions thereof, or may be sampled multiple times and those samples averaged, filtered, dithered, etc., to produce the digitized versions.

Shown below is a chart summarizing which transistor is the calibrated transistor and which transistors are the read transistors, for each sector of the SVPWM when using this first technique.

|  | Sector 1 | Sector 2 | Sector 3 | Sector 4 | Sector 5 | Sector 6 |
|---|---|---|---|---|---|---|
| Calibrated Transistors (during 2nd period) | MN2 | MN4 | MN4 | MN6 | MN6 | MN2 |
| Read Transistors (during 4th period) | MN2, MN4 | MN4, MN2 | MN4, MN6 | MN6, MN4 | MN6, MN2 | MN2, MN6 |

Note that in this chart, the selection of the second transistor to be read during the fourth period (e.g., MN4 in Sector 1, MN2 in Sector 2, MN6 in Sector 3, MN4 in Sector 4, MN2 in Sector 5, and MN6 in Sector 6) is performed considering the two largest duty cycles available in each sector. The other transistor (for example, MN6 in the case of Sector 1) could be chosen, but its duty cycle may not be long enough to complete the sampling of the voltage across that transistor. As such, those of skill in the art should recognize that this chart shows an optimized selection of transistors to be read based upon this target, and that other selections could be possible according to different targets, or if different PWM modulation techniques were used as opposed to SVPWM.

As can be understood from the chart, the oldest calibration drain to source resistance used is three sectors old.

A full cycle of this first technique will now be shown graphically and mathematically with reference to FIGS. 3A-3F.

A. First SVPWM Sector

Turning now to the first SVPWM sector, the phase current determination technique is continued over the seven periods P1-P7. U1 is high (which, as can be seen, causes MN2 to turn on) from the beginning of the second period through to the end of the sixth period, V1 is high (which, as can be seen, causes MN4 to turn on) from the beginning of the third period through the end of the fifth period, and W1 is high (which, as can be seen, causes MN6 to turn on) during the fourth period. Wh, Vh, and Uh are the complements of W1, V1, and U1, and therefore the operation of the transistors MN1, MN3, MN5 is complementary to the operation of transistors MN2, MN4, MN6 described above.

The phase currents Iu, Iv, Iw are calculated during the first SVPWM sector as follows, with it being understood that amplification/filtering/digitization block 14 is digitizing and conditioning Vshunt as well as Vu, Vv, and Vw in the measuring steps described below, and that the microcontroller 13 is in turn generating the control signals Uh, U1, Vh, V1, Wh, and W1.

During the second period, the shunt voltage Vshunt is measured across the shunt resistor Rsh, and here settles at a value of Vu2_sh, and the voltage Vu is measured and settles at −Vu2_mos. From this, the drain to source voltage of MN2 can be calculated as:

$$RdsMN2 = \frac{Rshunt * Vu2\_mos}{Vu2\_sh}$$

During the fourth period, the voltages Vu and Vv are measured, and here respectively settle at values of Vu4_mos and Vv4_mos. Now, the phase currents Iu, Iv, and Iw can be calculated. In particular, having the value of RdsMN2, the phase current Iu can be calculated as:

$Iu=Vu4\_mos/RdsMN2$

Having the value RdsMN4 from the prior last time this value was calculated, the phase current Iv can be calculated as:

$Iv=Vv4\_mos/RdsMN4$

Since the sum of the phase currents Iu, Iv, and Iw is zero, Iw can therefore be calculated as:

$Iw=-(Vu4\_mos/RdsMN2+Vv4\_mos/RdsMN4)$

The values of Vshunt and Vu measured during the second period are to be measured simultaneously, substantially simultaneously, or as close together in time as possible. In addition, this measurement involves the digitization of the analog values of Vshunt and Vu by the amplification/filtering/digitization block 14, and these analog values may be sampled once to produce the digitized versions of Vshunt and Vu, or may be sampled multiple times and those samples averaged to produce the digitized versions of Vshunt and Vu.

Similarly, the values of Vu and Vv measured during the fourth period are to be measured simultaneously, substantially simultaneously, or as close together in time as possible. In addition, this measurement involves the digitization of the analog values of Vu and Vv by the amplification/filtering/digitization block 14, and these analog values may be sampled once to produce the digitized versions of Vu and Vv, or may be sampled multiple times and those samples averaged to produce the digitized versions of Vu and Vv.

B. Second SVPWM Sector

Turning now to the second SVPWM sector, the phase current determination technique is continued over the seven periods P1-P7. As can be seen, U1 is high (causing MN2 to turn on) from the beginning of the third period through to the end of the fifth period, V1 is high (causing MN4 to turn on) from the beginning of the second period through the end of the sixth period, and W1 is high (causing MN6 to turn on) during the fourth period. Wh, Vh, and Uh are the complements of W1, V1, and U1, and therefore the operation of the transistors MN1, MN3, MN5 is complementary to the operation of transistors MN2, MN4, MN6 described above.

The phase currents Iu, Iv, Iw are calculated during the second SVPWM sector as follows, with it being understood that amplification/filtering/digitization block 14 is digitizing and conditioning Vshunt as well as Vu, Vv, and Vw in the measuring steps described below, and that the microcontroller 13 is in turn generating the control signals Uh, U1, Vh, V1, Wh, and W1.

During the second period, the shunt voltage Vshunt is measured across the shunt resistor Rsh, and here settles at a value of Vv2_sh, and the voltage Vv is measured and settles at −Vv2_mos. From this, the drain to source voltage of MN4 can be calculated as:

$$RdsMN4 = \frac{Rshunt * Vv2\_mos}{Vv2\_sh}$$

During the fourth period, the voltages Vu and Vv are measured, and here respectively settle at values of Vu4_mos and Vv4_mos. Now, the phase currents Iu, Iv, and Iw can be calculated. In particular, having the value of RdsMN4, the phase current Iv can be calculated as:

$Iv=Vv4\_mos/RdsMN4$

Having the value RdsMN2 from the first sector of the SVPWM, the phase current Iu can be calculated as:

$Iu=Vu4\_mos/RdsMN2$

Since the sum of the phase currents Iu, Iv, and Iw is zero, Iw can therefore be calculated as:

$Iw=-(Vu4\_mos/RdsMN2+Vv4\_mos/RdsMN4)$

The values of Vshunt and Vv measured during the second period are to be measured simultaneously, substantially simultaneously, or as close together in time as possible. In addition, this measurement involves the digitization of the analog values of Vshunt and Vu by the amplification/filtering/digitization block 14, and these analog values may be sampled once to produce the digitized versions of Vshunt and Vv, or may be sampled multiple times and those samples averaged to produce the digitized versions of Vshunt and Vv.

Similarly, the values of Vu and Vv measured during the fourth period are to be measured simultaneously, substantially simultaneously, or as close together in time as possible. In addition, this measurement involves the digitization of the analog values of Vu and Vv by the amplification/filtering/digitization block 14, and these analog values may be sampled once to produce the digitized versions of Vu and Vv, or may be sampled multiple times and those samples averaged to produce the digitized versions of Vu and Vv.

C. Third SVPWM Sector

Turning now to the third SVPWM sector, the phase current determination technique is continued over the seven periods P1-P7. As can be seen, U1 is high (causing MN2 to turn on) during the fourth period, V1 is high (causing MN4 to turn on) from the beginning of the second period through the end of the sixth period, and W1 is high (causing MN6 to turn on) from the beginning of the third period to the end of the fifth period. Wh, Vh, and Uh are the complements of W1, V1, and U1, and therefore the operation of the transistors MN1, MN3, MN5 is complementary to the operation of transistors MN2, MN4, MN6 described above.

The phase currents Iu, Iv, Iw are calculated during the third SVPWM sector as follows, with it being understood that amplification/filtering/digitization block 14 is digitizing and conditioning Vshunt as well as Vu, Vv, and Vw in the measuring steps described below, and that the microcontroller 13 is in turn generating the control signals Uh, U1, Vh, V1, Wh, and W1.

During the second period, the shunt voltage Vshunt is measured across the shunt resistor Rsh, and here settles at a value of Vv2_sh, and the voltage Vv is measured and settles at −Vv2_mos. From this, the drain to source voltage of MN4 can be calculated as:

$$RdsMN4 = \frac{Rshunt * Vv2\_mos}{Vv2\_sh}$$

During the fourth period, the voltages Vv and Vw are measured, and here respectively settle at values of Vv4_mos and Vw4_mos. Now, the phase currents Iu, Iv, and Iw can be calculated. In particular, having the value of RdsMN4, the phase current Iv can be calculated as:

$Iv=Vv4\_mos/RdsMN4$

Having the value RdsMN6 from a prior sector of the SVPWM, the phase current Iw can be calculated as:

$Iw=Vw4\_mos/RdsMN6$

Since the sum of the phase currents Iu, Iv, and Iw is zero, Iu can therefore be calculated as:

$Iu=-(Vv4\_mos/RdsMN4+Vw4\_mos/RdsMN6)$

The values of Vshunt and Vv measured during the second period are to be measured simultaneously, substantially simultaneously, or as close together in time as possible. In addition, this measurement involves the digitization of the analog values of Vshunt and Vu by the amplification/filtering/digitization block 14, and these analog values may be sampled once to produce the digitized versions of Vshunt and Vv, or may be sampled multiple times and those samples averaged to produce the digitized versions of Vshunt and Vv.

Similarly, the values of Vv and Vw measured during the fourth period are to be measured simultaneously, substantially simultaneously, or as close together in time as possible. In addition, this measurement involves the digitization of the analog values of Vv and Vw by the amplification/filtering/digitization block 14, and these analog values may be sampled once to produce the digitized versions of Vv and Vw, or may be sampled multiple times and those samples averaged to produce the digitized versions of Vv and Vw.

D. Fourth SVPWM Sector

Turning now to the fourth SVPWM sector, the phase current determination technique is continued over the seven periods P1-P7. As can be seen, U1 is high (causing MN2 to turn on) during the fourth period, V1 is high (causing MN4 to turn on) from the beginning of the third period to the end of the fifth period, and W1 is high (causing MN6 to turn on) from the beginning of the second period to the end of the sixth period. Wh, Vh, and Uh are the complements of W1, V1, and U1, and therefore the operation of the transistors MN1, MN3, MN5 is complementary to the operation of transistors MN2, MN4, MN6 described above.

The phase currents Iu, Iv, Iw are calculated during the fourth SVPWM sector as follows, with it being understood that amplification/filtering/digitization block 14 is digitizing and conditioning Vshunt as well as Vu, Vv, and Vw in the measuring steps described below, and that the microcontroller 13 is in turn generating the control signals Uh, U1, Vh, V1, Wh, and W1.

During the second period, the shunt voltage Vshunt is measured across the shunt resistor Rsh, and here settles at a value of Vw2_sh, and the voltage Vw is measured, and here settles at a value of Vw2_mos. From this, the drain to source resistance of MN6 can be calculated as:

$$RdsMN6 = \frac{Rshunt * Vw2\_mos}{Vw2\_sh}$$

During the fourth period, the voltage Vv is measured, and here settles at a value of Vv4_mos, and the voltage Vw is measured, and here settles at a value of Vw4_mos. Now, having the value of RdsMN6, and having the value of RdsMN4 from the prior SVPWM sector, the phase current Iv can be calculated as:

$$Iv=Vv4\_mos/RdsMN4$$

In turn, the phase current Iw can be calculated as:

$$IW=Vw4\_mos/RdsMN6$$

Since the sum of the phase currents Iu, Iv, and Iw is zero, Iu can therefore be calculated as:

$$Iu=-(Vv4\_mos/RdsMN4+Vw4\_mos/RdsMN6)$$

The values of Vshunt and Vw measured during the second period are to be measured simultaneously, substantially simultaneously, or as close together in time as possible. In addition, this measurement involves the digitization of the analog values of Vshunt and Vw by the amplification/filtering/digitization block 14, and these analog values may be sampled once to produce the digitized versions of Vshunt and Vw, or may be sampled multiple times and those samples averaged to produce the digitized versions of Vshunt and Vw.

The values of Vv and Vw measured during the fourth period are to be measured simultaneously, substantially simultaneously, or as close together in time as possible. In addition, this measurement involves the digitization of the analog values of Vv and Vw by the amplification/filtering/digitization block 14, and these analog values may be sampled once to produce the digitized versions of Vv and Vw, or may be sampled multiple times and those samples averaged to produce the digitized versions of Vv and Vw.

E. Fifth SVPWM Sector

Turning now to the fifth SVPWM sector, the phase current determination technique is continued over the seven periods P1-P7. As can be seen, U1 is high (causing MN2 to turn on) from the beginning of the third period to the end of the fifth period, V1 is high (causing MN4 to turn on) during the fourth period, and W1 is high (causing MN6 to turn on) from the beginning of the second period to the end of the sixth period. Wh, Vh, and Uh are the complements of W1, V1, and U1, and therefore the operation of the transistors MN1, MN3, MN5 is complementary to the operation of transistors MN2, MN4, MN6 described above.

The phase currents Iu, Iv, Iw are calculated during the fifth SVPWM sector as follows, with it being understood that amplification/filtering/digitization block 14 is digitizing and conditioning Vshunt as well as Vu, Vv, and Vw in the measuring steps described below, and that the microcontroller 13 is in turn generating the control signals Uh, U1, Vh, V1, Wh, and W1.

During the second period, the shunt voltage Vshunt is measured across the shunt resistor Rsh, and here settles at a value of Vw2_sh, and the voltage Vw is measured, and here settles at a value of Vw2_mos. From this, the drain to source resistance of MN6 can be calculated as:

$$RdsMN6 = \frac{Rshunt * Vw2\_mos}{Vw2\_sh}$$

During the fourth period, the voltage Vu is measured, and here settles at a value of Vu4_mos, and the voltage Vw is measured, and here settles at a value of Vw4_mos. Now, having the value of RdsMN6, and having the value of RdsMN2 from a prior SVPWM sector, the phase current Iv can be calculated as:

$$Iu=Vu4\_mos/RdsMN2$$

In turn, the phase current Iw can be calculated as:

$$IW=Vw4\_mos/RdsMN6$$

Since the sum of the phase currents Iu, Iv, and Iw is zero, Iv can therefore be calculated as:

$$Iv=-(Vu4\_mos/RdsMN2+Vw4\_mos/RdsMN6)$$

The values of Vshunt and Vw measured during the second period are to be measured simultaneously, substantially simultaneously, or as close together in time as possible. In addition, this measurement involves the digitization of the analog values of Vshunt and Vw by the amplification/filtering/digitization block 14, and these analog values may be sampled once to produce the digitized versions of Vshunt and Vw, or may be sampled multiple times and those samples averaged to produce the digitized versions of Vshunt and Vw.

The values of Vu and Vw measured during the fourth period are to be measured simultaneously, substantially simultaneously, or as close together in time as possible. In addition, this measurement involves the digitization of the analog values of Vu and Vw by the amplification/filtering/digitization block 14, and these analog values may be sampled once to produce the digitized versions of Vu and Vw, or may be sampled multiple times and those samples averaged to produce the digitized versions of Vu and Vw.

F. Sixth SVPWM Sector

Turning now to the sixth SVPWM sector, the phase current determination technique is continued over the seven periods P1-P7. As can be seen, U1 is high (causing MN2 to turn on) from the beginning of the second period to the end of the sixth period, V1 is high (causing MN4 to turn on) during the fourth period, and W1 is high (causing MN6 to turn on) from the beginning of the third period to the end of the fifth period. Wh, Vh, and Uh are the complements of W1, V1, and U1, and therefore the operation of the transistors MN1, MN3, MN5 is complementary to the operation of transistors MN2, MN4, MN6 described above.

The phase currents Iu, Iv, Iw are calculated during the sixth SVPWM sector as follows, with it being understood that amplification/filtering/digitization block 14 is digitizing and conditioning Vshunt as well as Vu, Vv, and Vw in the measuring steps described below, and that the microcontroller 13 is in turn generating the control signals Uh, U1, Vh, V1, Wh, and W1.

During the second period, the shunt voltage Vshunt is measured across the shunt resistor Rsh, and here settles at a value of Vu2_sh, and the voltage Vu is measured, and here settles at a value of Vu2_mos. From this, the drain to source resistance of MN2 can be calculated as:

$$RdsMN2 = \frac{Rshunt * Vu2\_mos}{Vu2\_sh}$$

During the fourth period, the voltage Vu is measured, and here settles at a value of Vu4_mos, and the voltage Vw is measured, and here settles at a value of Vw4_mos. Now, having the value of RdsMN2, and having the value of RdsMN6 from a prior SVPWM sector, the phase current Iu can be calculated as:

$$Iu=Vu4\_mos/RdsMN2$$

In turn, the phase current Iw can be calculated as:

$$Iw=Vw4\_mos/RdsMN6$$

Since the sum of the phase currents Iu, Iv, and Iw is zero, Iv can therefore be calculated as:

$$Iv=-(Vu4\_mos/RdsMN2+Vw4\_mos/RdsMN6)$$

The values of Vshunt and Vu measured during the second period are to be measured simultaneously, substantially simultaneously, or as close together in time as possible. In addition, this measurement involves the digitization of the analog values of Vshunt and Vu by the amplification/filtering/digitization block 14, and these analog values may be sampled once to produce the digitized versions of Vshunt and Vu, or may be sampled multiple times and those samples averaged to produce the digitized versions of Vshunt and Vu.

The values of Vu and Vw measured during the fourth period are to be measured simultaneously, substantially simultaneously, or as close together in time as possible. In addition, this measurement involves the digitization of the analog values of Vu and Vw by the amplification/filtering/digitization block 14, and these analog values may be sampled once to produce the digitized versions of Vu and Vw, or may be sampled multiple times and those samples averaged to produce the digitized versions of Vu and Vw.

Variant of the First Technique (for Low Electric Machine Speed)

Given the detailed disclosure above of how the first technique works, below is a chart summarizing a variant of the first technique to be used where the electric machine speed is low. Other than the changes in the read transistors for some sectors of the SVPWM, the technique remains the same. Therefore, just the chart for this variant is given, as one of skill in the art will (with the benefit of the above disclosure) well understand how to implement this variant of the first technique.

|  | Sector 1 | Sector 2 | Sector 3 | Sector 4 | Sector 5 | Sector 6 |
| --- | --- | --- | --- | --- | --- | --- |
| Calibrated Transistors (during 2nd period) | MN2 | MN4 | MN4 | MN6 | MN6 | MN2 |
| Read Transistors (during 4th period) | MN2, MN6 | MN4, MN2 | MN4, MN2 | MN6, MN4 | MN6, MN4 | MN2, MN6 |

First Technique (Lower Cost Variant)

Given the detailed disclosure above of how the first technique works, below is a chart summarizing a first variant of the first technique in which the voltage of one of the phases is never measured.

|  | Sector 1 | Sector 2 | Sector 3 | Sector 4 | Sector 5 | Sector 6 |
| --- | --- | --- | --- | --- | --- | --- |
| Calibrated Transistors (during 2nd period) | MN2 | MN4 | MN4 | No Calibration | No Calibration | MN2 |
| Read Transistors (during 4th period) | MN2, MN4 | MN4, MN2 | MN4, MN2 | MN4 | MN4 | MN2, MN4 |

Second Technique

A second technique will now be described. In general, this technique works by measuring Vshunt and one of the voltages Vu, Vv, Vw during the second period of each sector of the SVPWM, and from those two measured voltages calculating the drain to source resistance of the transistor across which the voltage Vu, Vv, or Vw was measured (e.g., MN2, MN4, MN6)—this drain to source resistance can be referred to as the first calibrated drain to source resistance for that sector of the SVPWM, and the corresponding transistor can be referred to as the first calibrated transistor.

Next, during the third period of each sector of the SVPWM, the technique continues with measuring Vshunt again, the corresponding voltage Vu, Vv, or Vw is measured across the first calibrated transistor, and a voltage Vu, Vv, or Vw is measured across a next transistor to be calibrated, which can be referred to as the second calibrated transistor. From these three measured voltages, the drain to source resistance of the second calibrated transistor can be calculated, and can be referred to as the second calibrated drain to source resistance.

Then, during the fourth period of each sector of the SVPWM, the voltages Vu, Vv, or Vw that were measured during the third period are measured again. The transistors corresponding to the voltages read during the fourth period of each sector of the SVPWM can be referred to as the read transistors.

Using the first calibrated drain to source resistance and the voltage across the first calibrated transistor that was measured again during the fourth period, the phase current flowing through the first calibrated transistor is calculated. Then, using the second calibrated drain to source resistance and the voltage across the second calibrated transistor that was measured again during the fourth period, the phase current flowing through the second calibrated transistor is calculated. Finally, since the sum of the phase currents is known to be zero, from the two calculated phase currents for that sector of the SVPWM, the remaining phase current can be calculated.

Therefore, this second technique can be briefly summed up by the following steps:

1. Measure Vshunt and a phase voltage (Vu, Vv, or Vw) corresponding to voltage across the first transistor to be calibrated, during second period of the SVPWM sector.
2. Calculate the calibrated drain to source resistance RDS of the first calibrated transistor (MN2, MN4, or MN6) as:

$$Rds(\text{First Calibrated Transistor}) = \frac{Rshunt * V1\text{phase}2}{Vshunt2}$$

where "first calibrated transistor" is the first transistor being calibrated during that sector of the SVPWM, "Rshunt" is the resistance of the resistor Rshunt, "Vshunt2" is the voltage across Rshunt during the second period of that sector of the SVPWM, and "V1phase2" is the voltage across the first calibrated transistor during the second period of that sector of the SVPWM.

3. Measure Vshunt, a phase voltage (Vu, Vv, or Vw) corresponding to the voltage across the first calibrated transistor, and a phase voltage (Vu, Vv, or Vw) corresponding to a voltage across another of the transistors (MN2, MN4, or MN6) which will become the second calibrated transistor, during the third period of the SVPWM sector.

4. Calculate the calibrated drain to source resistance RDS of the second calibrated transistor (MN2, MN4, or MN6) as:

$$Rds\text{(Second Calibrated Transistor)} = \frac{V2phase3 * Rshunt * Rds\text{(First Calibrated Transistor)}}{Vshunt3 * \text{(First Calibrated Transistor)} - V1phase3 * Rshunt}$$

where "second calibrated transistor" is the second transistor being calibrated during that sector of the VSPWM, "Rshunt" is the resistance of the resistor Rshunt, "Vshunt3" is the voltage across Rshunt during the third period of that sector of the SVPWM, "V1phase3" is the voltage across the first calibrated transistor during the third period of that sector of the SVPWM, and "V2phase3" is the voltage across the second calibrated transistor during the third period of that sector of the SVPWM.

5. Measure the voltages across the first and second calibrated transistors (MN2, MN4, or MN6), during the fourth period of that SVPWM sector.

6. Calculate the phase current for the first calibrated transistor as:

$I\text{phase(First Calibrated Transistor)} = V1phase4/Rds$ (First Calibrated Transistor)

where "first calibrated transistor" is the first transistor that was calibrated during that sector of the SVPWM, and "V1phase4" is the voltage across the first calibrated transistor during the fourth period of that sector of the SVPWM.

7. Calculate the phase current for the second calibrated transistor as:

$I\text{phase(Second Calibrated Transistor)} = V2phase4/Rds$ (Second Calibrated Transistor)

where "second calibrated transistor" is the second transistor that was calibrated during that sector of the SVPWM, and "V2phase4" is the voltage across the second calibrated transistor during the fourth period of that sector of the SVPWM.

8. Calculate the phase current for the remaining transistor as:

$I\text{phase(Remaining Transistor)} = -[I\text{phase(First Calibrated Transistor)} + I\text{phase(Second Transistor)}]$ Note that the values measured during the second period of the SVPWM sectors are to be measured simultaneously, substantially simultaneously, or as close together in time as possible. This measurement involves the digitization of the measured values by the amplification/filtering/digitization block 14, and these values may be sampled once to produce the digitized versions thereof, or may be sampled multiple times and those samples averaged to produce the digitized versions.

In addition, the values measured during the third period of the SVPWM sectors are to be measured simultaneously, substantially simultaneously, or as close together in time as possible. This measurement involves the digitization of the measured values by the amplification/filtering/digitization block 14, and these values may be sampled once to produce the digitized versions thereof, or may be sampled multiple times and those samples averaged to produce the digitized versions.

The values measured during the fourth period of the SVPWM sectors are to be measured simultaneously, substantially simultaneously, or as close together in time as possible. This measurement involves the digitization of the measured values by the amplification/filtering/digitization block 14, and these values may be sampled once to produce the digitized versions thereof, or may be sampled multiple times and those samples averaged to produce the digitized versions.

Shown below is a chart summarizing which transistors are the calibrated transistor and which transistors are the read transistors, for each sector of the SVPWM when using this second technique.

|  | Sector 1 | Sector 2 | Sector 3 | Sector 4 | Sector 5 | Sector 6 |
|---|---|---|---|---|---|---|
| Calibrated Transistors (during 2nd period and 3rd Period) | MN2, MN4 | MN4, MN2 | MN4, MN6 | MN6, MN4 | MN6, MN2 | MN2, MN6 |
| Read Transistors (during 4th period) | MN2, MN4 | MN4, MN2 | MN4, MN6 | MN6, MN4 | MN6, MN2 | MN2, MN6 |

Figure 4:
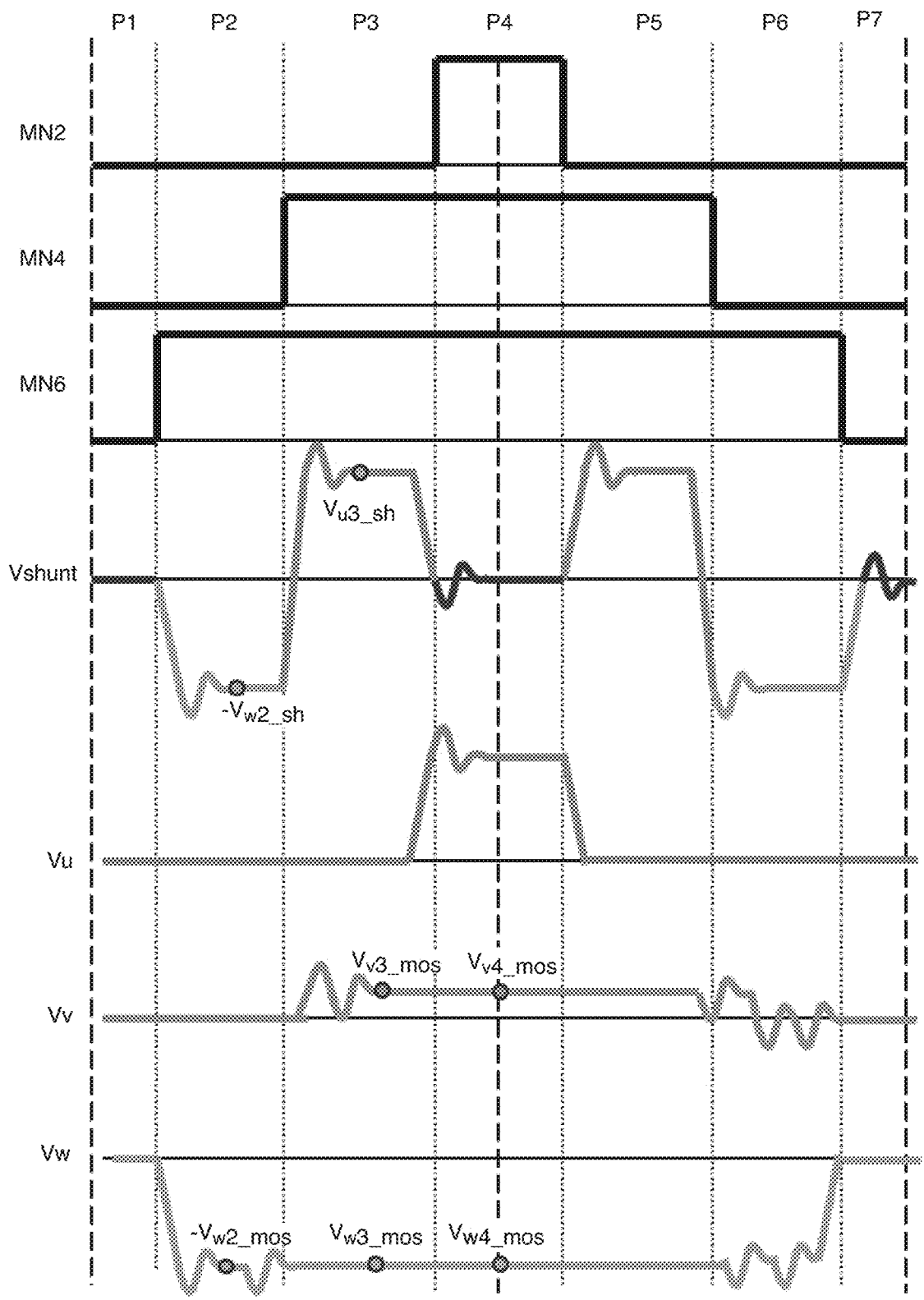
FIG. 4 is a graph showing operation of the three-phase inverter of the power system of FIG. 1 during the fourth sector of SVPWM and showing sampling points for performing a second phase current determination technique described herein used to calculate the drain-to-source resistances of the transistors of the inverter of FIG. 1A.

An example SVPWM sector for this second technique is shown in FIG. 4. Here, the fourth SVPWM is shown, and the phase current determination technique is continued over the seven periods P1-P7. As can be seen, W1 is high (causing MN6 to turn on) from the beginning of the second period to the end of the sixth period, V1 is high (causing MN4 to turn on) from the beginning of the third period to the end of the fifth period, and W1 is high during the fourth period. Wh, Vh, and Uh are the complements of W1, V1, and U1, and therefore the operation of the transistors MN1, MN3, MN5 is complementary to the operation of transistors MN2, MN4, MN6 described above.

The phase currents Iu, Iv, Iw are calculated during the fourth SVPWM sector as follows, with it being understood that amplification/filtering/digitization block 14 is digitizing and conditioning Vshunt as well as Vu, Vv, and Vw in the measuring steps described below, and that the microcontroller 13 is in turn generating the control signals Uh, U1, Vh, V1, Wh, and W1.

During the second period, the shunt voltage Vshunt is measured across the shunt resistor Rsh, and here settles at a value of Vw2_sh, and the voltage Vw is measured, and here settles at a value of Vw2_mos. From this, the drain to source resistance of MN6 can be calculated as:

$$RdsMN6 = \frac{Rshunt * Vw2\_mos}{Vw2\_sh}$$

During the third period, the shunt voltage Vshunt is measured, and here settles at a value of Vu3_sh, the voltage Vv is measured, and here settles at a value of Vv3_mos, and the voltage Vw is measured, and here settles at a value of Vw3_mos. From this, the drain to source resistance of MN4 can be calculated as:

$$RdsMN4 = \frac{Vv3_{mos} * Rshunt * RdsMN6}{Vu3_{sh} * RdsMN6 - Vw3_{mos} * Rshunt}$$

During the fourth period, the voltage Vv is measured, and here settles at a value of Vv4_mos, and the voltage Vw is measured, and here settles at a value of Vw4_mos. Now, having the values of RdsMN6 and RdsMN4, the phase current Iv can be calculated as:

$$Iv = Vv4\_mos/RdsMN4$$

In turn, the phase current Iw can be calculated as:

$$IW = Vw4\_mos/RdsMN6$$

Since the sum of the phase currents Iu, Iv, and Iw is zero, Iu can therefore be calculated as:

$$Iu = -(Vv4\_mos/RdsMN4 + Vw4\_mos/RdsMN6)$$

The values of Vshunt and Vw measured during the second period are to be measured simultaneously, substantially simultaneously, or as close together in time as possible. In addition, this measurement involves the digitization of the analog values of Vshunt and Vw by the amplification/filtering/digitization block 14, and these analog values may be sampled once to produce the digitized versions of Vshunt and Vw, or may be sampled multiple times and those samples averaged to produce the digitized versions of Vshunt and Vw.

Similarly, the values of Vshunt, Vv, and Vw measured during the third period are to be measured simultaneously, substantially simultaneously, or as close together in time as possible. In addition, this measurement involves the digitization of the analog values of Vshunt, Vv, and Vw by the amplification/filtering/digitization block 14, and these analog values may be sampled once to produce the digitized versions of Vshunt, Vv, and Vw, or may be sampled multiple times and those samples averaged to produce the digitized versions of Vshunt, Vv, and Vw.

Likewise, the values of Vv and Vw measured during the fourth period are to be measured simultaneously, substantially simultaneously, or as close together in time as possible. In addition, this measurement involves the digitization of the analog values of Vv and Vw by the amplification/filtering/digitization block 14, and these analog values may be sampled once to produce the digitized versions of Vv and Vw, or may be sampled multiple times and those samples averaged to produce the digitized versions of Vv and Vw.

Second Technique (Lower Cost Variant)

Given the detailed disclosure above of how the second technique works, below is a chart summarizing a first variant of the second technique in which the voltage of one of the phases is never measured, and in which two transistors are not calibrated at every period.

|  | Sector 1 | Sector 2 | Sector 3 | Sector 4 | Sector 5 | Sector 6 |
|---|---|---|---|---|---|---|
| Calibrated Transistors (during 2nd period and 3rd Period) | MN2, MN4 | MN4, MN2 | MN4 |  |  | MN2 |
| Read Transistors (during 4th period) | MN2, MN4 | MN4, MN2 | MN4, MN2 | MN2, MN4 | MN2, MN4 | MN2, MN4 |

General Comments Applicable to First and Second Techniques

Although the techniques described above have been described with respect to the measurement of the voltages across the low side transistors and determination of drain to source resistances of the low side transistors, those of skill in the art will appreciate that the techniques are equally applicable to high side transistors.

As compared to prior art systems utilizing one shunt per phase winding or two shunts per phase winding, the techniques disclosed herein provide for reduced power losses, reduced cost of production, and elimination of asymmetry in the three-phase inverter bridge.

As compared to the prior art systems that also utilize one shunt, the techniques disclosed herein eliminate difficulties encounters when reading voltages in boundary conditions, and provide for simultaneous or substantially simultaneous sampling of two phase voltages (allowing for more accurate results).

In addition, it should be noted that the techniques described above can be applied to other PWM patterns, such as sinusoidal, third harmonic, discontinuous SVPWM, etc. While which measurements are taken during what periods may change, the concept of the transistor calibration described above remains valid.

Further details of the above described techniques may be found in U.S. Pat. No. 11,105,836, the contents of which are incorporated by reference in their entirety.

Use of Phase Current Determination Techniques to Perform Temperature Sensing

Operation of the power system 10 to perform temperature sensing on the transistors MN1-MN6 and modification of the inverter operation performed thereon is now described with reference to FIG. 1A.

This operation proceeds in a calibration (e.g., "offline") phase and an operation (e.g., "online") phase. The calibration phase may be performed once after manufacture, or may performed upon each startup of the power system 10.

In the calibration phase, an interpolation method is used by the microcontroller 13 to correlate the drain to source resistances of the transistors MN1-MN6 to junction temperature thereof. To that end, according to a simpler first technique, manufacturing tolerances and process variations may be ignored, and the junction temperature Tjunction at multiple different values of RDSON is determined by the microcontroller 13. This determination may be performed by assuming known values (e.g., from the data sheet of the transistors MN1-MN6) to be true, and normalizing those values. Below is a table showing sample values of Tjunction and normalized RDSON for the transistors MN1-MN6.

| RDSON (mΩ) | Tjunction (° C.) |
|---|---|
| 1.68 | −50 |
| 1.92 | −25 |
| 2.11 | 0 |
| 2.40 | 25 |
| 2.68 | 50 |
| 2.97 | 75 |
| 3.28 | 100 |
| 3.64 | 125 |
| 4.00 | 150 |
| 4.39 | 175 |

Figure 5:
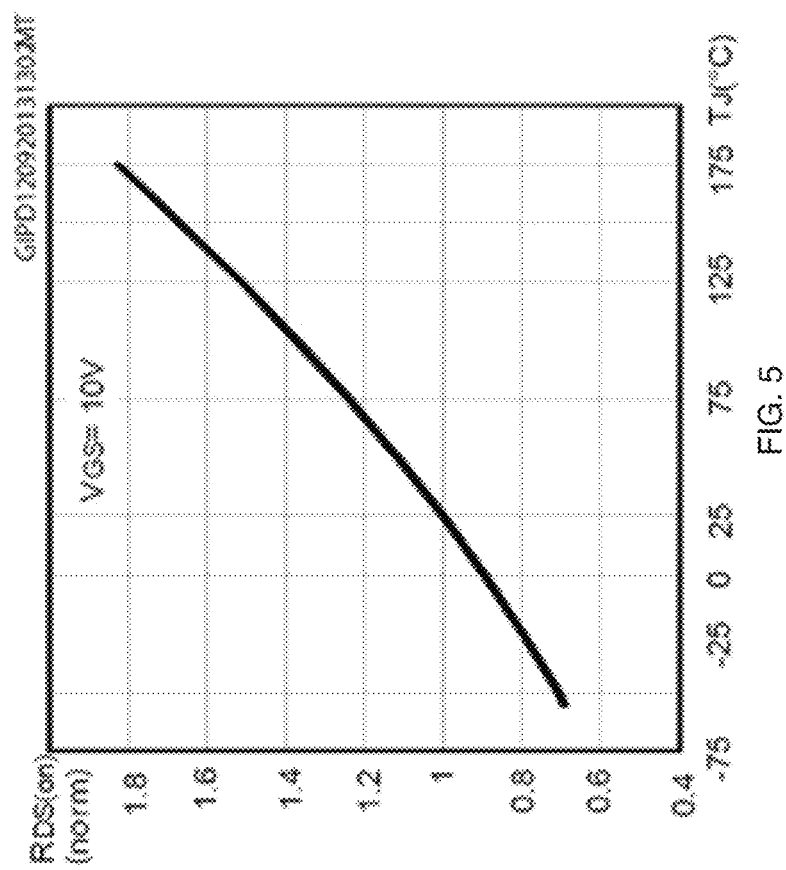
FIG. 5 is a graph showing sample assumed values of drain-to-source resistance of a given transistor compared to assumed temperatures at those drain-to-source resistance values.

The normalization can be performed by the microcontroller 13 based on the known value of RDSON at a given junction temperature, for example at a junction temperature Tjunction of 25° C. For example, the pre-known value of RDSON at a junction temperature Tjunction of 25° C. can be set to 1, and then the remainder of the pre-known values of RDSON at different junction temperatures Tjunction can be normalized to this normalized value of RDSON (25° C.). Sample normalized values of RDSON vs junction temperature Tjunction for a given type of transistor MN1-MN6 can be observed in the graph of FIG. 5.

According to a more complex second technique, manufacturing tolerances and process variations are taken into account. Here, the electric machine 11 includes a case 30 carrying the transistors MN1-MN6, and a conventional temperature sensor 31 providing a temperature output to the control circuitry 15. Therefore, during the calibration phase when the power system 10 is cold (e.g., has not been in operation for a certain period of time), the temperature sensor 31 reads the temperature within the case 30 and provides that reading to the microcontroller 13, and the RDSON value for the transistors MN2, MN4, and MN6 are read by the microcontroller 13 at the cold temperature present during the calibration phase. This reading is taken at the cold temperature because at the cold temperature present during the calibration phase, this reading will be roughly equivalent to the junction temperatures Tjunction within the transistors MN2, MN4, and MN6.

A calibration factor p_calib is calculated by the microcontroller 13 for each transistor MN2, MN4, and MN6 as a ratio of RDSON at the cold temperature RDSON_Calibrate to the expected assumed known value of RDSON at that temperature RDSON_Typical. The normalized junction temperatures Tjunction at multiple different values of RDSON determined above according to the first simpler technique are then multiplied by the calibration factor p_calib to produce calibrated, normalized values. Below is a table showing sample values of Tjunction and calibrated, normalized RDSON for the transistors MN2, MN4, and MN6.

| RDSON (mΩ) | Tjunction (° C.) |
| --- | --- |
| 1.68 × p_calib | −50 |
| 1.92 × p_calib | −25 |
| 2.11 × p_calib | 0 |
| 2.40 × p_calib | 25 |
| 2.68 × p_calib | 50 |
| 2.97 × p_calib | 75 |
| 3.28 × p_calib | 100 |
| 3.64 × p_calib | 125 |
| 4.00 × p_calib | 150 |
| 4.39 × p_calib | 175 |

Using the values of RDSON and Tjunction determined using either the simpler first technique or the more complex second technique, a second order polynomial interpolation method is performed by the microcontroller 13 to determine the coefficients of a relation function between Tjunction and RDSON. The resulting relation function is:

$$f(x)=p1 \cdot x^2+p2 \cdot x+p3,$$

where f(x) is Tjunction and x is RDSON.

Figure 6:
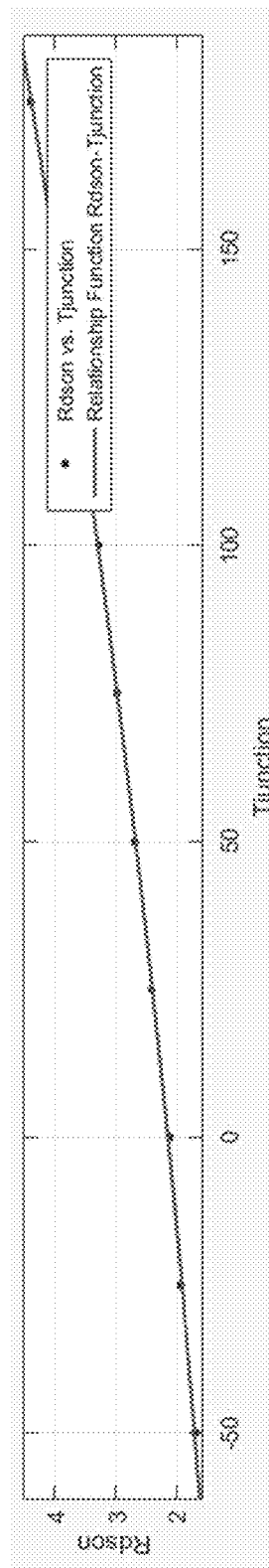
FIG. 6 is a graph showing the relation function of a non-linear model of drain-to-source resistance value compared to temperature, used herein to determine temperature of the transistors of the inverter.

A sample relation function determined as described above is shown in the graph of FIG. 6.

The determination of the relation function ends the calibration phase, and then the operation phase is commenced. During the operation phase, operation of the inverter 12 by the control circuitry 15 to drive the electric machine 11 as described above commenced, with the determined phase currents being used as feedback as described above to control generation of the control signals Uh, U1 for MN1-MN2, Vh, V1 for MN3-MN4, and Wh, W1 for MN5-MN6. In addition, as each value of RDSON for transistors MN2, MN4, and MN6 is calculated, the microcontroller 13 uses the relation function to determine the current junction temperature Tjunction of those transistors. In the below, since the current through MN1 will have the same magnitude as the current through MN2, since the current through MN3 will have the same magnitude as the current through MN4, and since the current through MN5 will have the same magnitude as the current through MN6, the RDSON value (and therefore Tjunction value) for MN1 can be assumed to be equal to the RDSON and Tjunction values for MN2, the RDSON and Tjunction values for MN3 can be assumed to be equal to the RDSON and Tjunction values for MN4, and the RDSON and Tjunction values for MN5 can be assumed to be equal to the RDSON and Tjunction values for MN6.

Figure 1B:
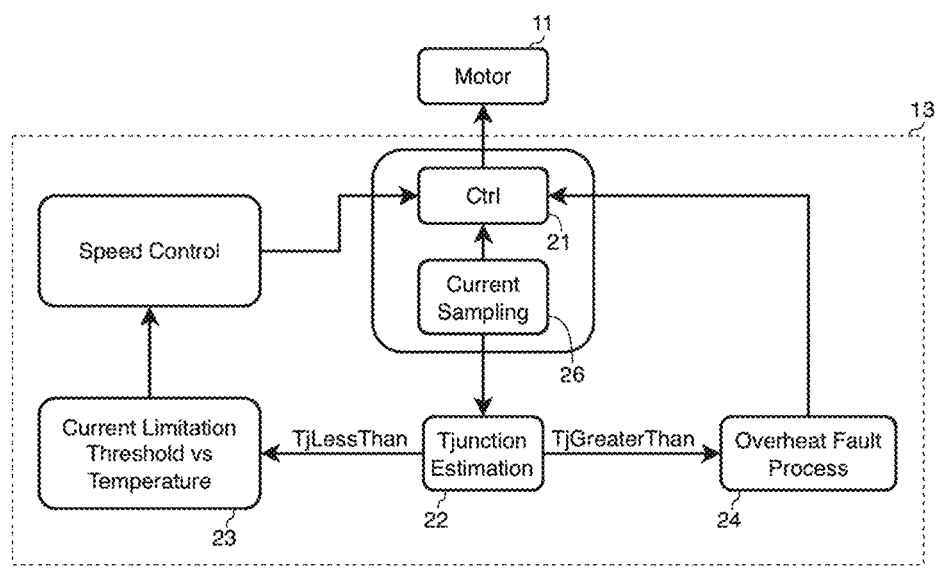
FIG. 1B is a block diagram showing functions performed by the control circuitry of the electric machine of FIG. 1A when performing the techniques described herein.

The junction temperatures Tjunction of the transistors MN2, MN4, and MN6 are used to maintain safe operation of the transistors MN1-MN6 to thereby avoid thermal stresses. This functionality is now described with additional reference to FIG. 1B. The determination of the phase currents and RDSON of transistors MN2, MN4, and MN6 is represented as current sampling 26 performed by the microcontroller 13, and the determination of Tjunction for each transistor is represented as Tjunction Estimation 22 performed by the microcontroller 22.

If Tjunction is greater than a maximum safe temperature Tmax for any of the transistors MN2, MN4, and MN6, then an overheating fault process 24 is performed by the microcontroller 13 to case operation of the inverter 12. To cease operation of the inverter 12, a control function 21 of the microcontroller 13 ceases the provision of the control signals Uh, U1, Vh, V1, and Wh, W1 to the inverter 12.

Figure 7:
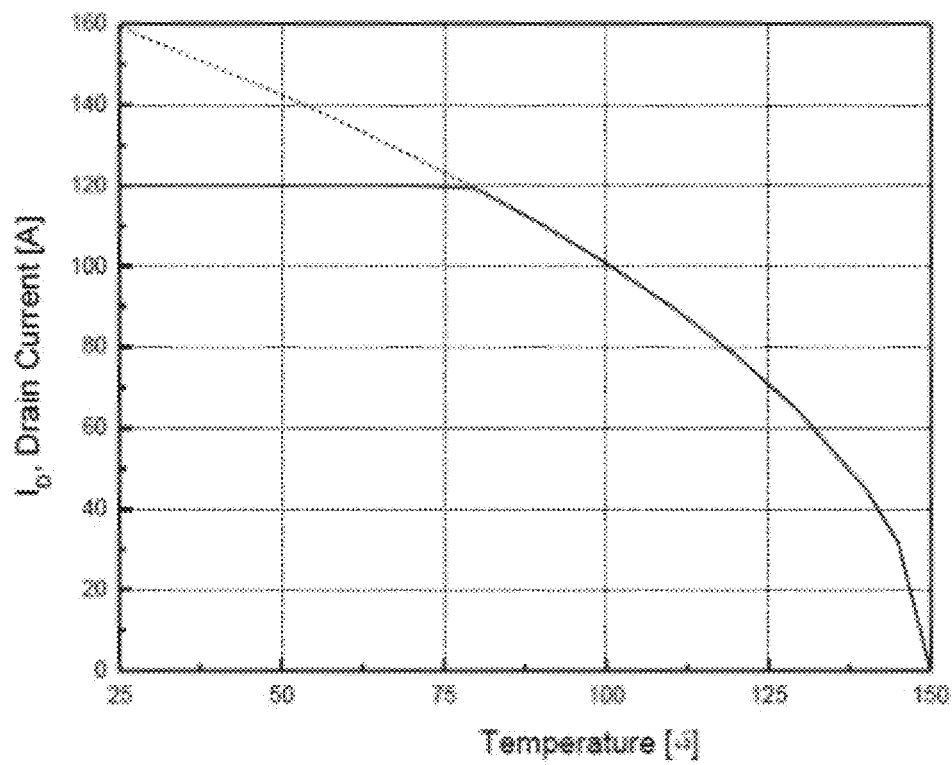
FIG. 7 is a graph showing drain current vs temperature in the electric machine of FIG. 1A when operating according to the functions shown in FIG. 1B.

Additionally, for each transistor MN2, MN4, and MN6, if Tjunction is less than the maximum safe operation temperature Tmax, then a current limitation threshold determination process 23 is performed by the microcontroller 13 by which a maximum safe current for that value of Tjunction is determined and used by the control function 21 of the microcontroller 13 to modify the provision of the control signals Uh, U1, Vh, V1, and Wh, W1 to the inverter 12 to maintain the current through that transistor at the maximum safe current for the current value of Tjunction. Through this functionality, the maximum safe current through the transistors MN2, MN4, and MN6 and correspondingly the transistors MN1, MN3, and MN5 is maintained regardless of current operation temperature, and current operating temperature is determined accurately. Since, as explained above, the Tjunction values of MN1 and MN2 can be considered to be the same, the Tjunction values of MN3 and MN4 can be considered to be the same, and the Tjunction values of MN5 and MN6 can be considered to be the same, the modification of control of these transistor pairs of performed correspondingly. For example, the control signals Uh and U1 are modified in the same fashion based upon the above, the control signals Vh and V1 are modified in the same fashion based upon the above, and the control signals Wh and W1 are modified in the same fashion based upon the above. The results of this operation can be observed in the graph of FIG. 7, showing how drain currents of transistors MN1-MN6 are reduced as they increase in temperature.

The benefits provided by this temperature determination technique are manifest. Since the actual junction temperatures of the transistors MN2, MN4, and MN6 are determined, this technique is immune to the inaccuracies that result from the use of traditional in-case temperature sensors, and is immune to inaccuracies that result from techniques that assume the values of RDSON instead of directly measuring the values of RDSON. Still further, the junction temperature of each transistor can be determined using the technique described herein, as opposed to the prior art techniques which would require the use of three or more in-case conventional temperature sensors to even attempt at determining the junction temperature of transistor, and even then, would be unable to do so because junction temperature changes at a faster rate than in-case temperature. Additionally, as explained, the dynamic adjustment of the inverter 12 based upon the thermal conditions of each transistor helps provide for the highest transfer of power possible at each instant in time.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. An electric device, comprising an inverter system to be coupled to phase windings of an electric machine to drive the electric machine, the inverter system comprising:
    switching branches coupled between a DC supply voltage node and an intermediate node, each of the switching branches having a terminal to be coupled to a respective phase winding of the electric machine;
    a shunt resistor coupled between the intermediate node and ground; and
    control circuitry configured to apply control signals in accordance with a control scheme to the switching branches to cause the inverter system to drive the phase windings of the electric machine with a multi-phase AC power signal;
    wherein the control scheme is divided into sectors, with each sector being divided into periods;
    wherein the control circuitry is configured to, during at least some sectors of the control scheme:
        during a first given period: measure a shunt voltage across the shunt resistor; and measure a drain to source voltage of a first calibration transistor, the first calibration transistor being a transistor of a given switching branch; and
        determine a drain to source resistance of the first calibration transistor as a function of a resistance of the shunt resistor, the drain to source voltage of the first calibration transistor measured during the first given period, and the shunt voltage measured during the first given period; and
    wherein the control circuitry is further configured to:
        control driving of the given switching branch;
        determine a temperature of the first calibration transistor during driving of the electric machine by the inverter system based upon the drain to source resistance of the first calibration transistor;
        modify driving of the given switching branch so as to maintain conductivity of the first calibration transistor at a highest level at which the temperature of the first calibration transistor remains below a threshold temperature; and
        cease driving of the given switching branch when the temperature of the first calibration transistor exceeds the threshold temperature.

2. The electric device of claim 1, wherein the control circuitry is further configured to, during a calibration phase, perform an interpolation on assumed values of the drain to source resistance of the first calibration transistor for given temperature values of the first calibration transistor to thereby generate a non-linear model of drain to source resistance to temperature for the first calibration transistor; and wherein the control circuitry determines the temperature of the first calibration transistor using the non-linear model and the drain to source resistance of the first calibration transistor.

3. The electric device of claim 2, wherein the control circuitry is further configured to, during the calibration phase, normalize the assumed values of the drain to source resistance of the first calibration transistor prior to performing the interpolation.

4. The electric device of claim 2, further comprising a case carrying at least the switching branches and the shunt resistor, with a temperature sensor being positioned within the case; and
    wherein the control circuitry is further configured to, during the calibration phase,
        read a temperature of an interior of the case from the temperature sensor;
        determine, from the assumed values of the drain to source resistance of the first calibration transistor for the given temperature values of the first calibration transistor, an expected drain to source resistance of the first calibration transistor for the read temperature;
        determine a ratio between the drain to source resistance of the first calibration transistor and the expected drain to source resistance of the first calibration transistor; and
        use the determined ratio to calibrate the assumed values of the drain to source resistance of the first calibration transistor for the given temperature values of the first calibration transistor prior to performing the interpolation such that the interpolation is performed on the calibrated assumed values of the drain to source resistance of the first calibration transistor for the given temperature values of the first calibration transistor.

5. The electric device of claim 4, wherein the control circuitry is further configured to, during the calibration phase, normalize the assumed values of the drain to source resistance of the first calibration transistor prior to determining the expected drain to source resistance of the first calibration transistor for the read temperature.

6. The electric device of claim 2, wherein the interpolation produces a second order non-linear model representing a relationship between drain to source resistance to temperature for the first calibration transistor.

7. The electric device of claim 1,
    wherein the electric machine has first, second, and third phase windings;
    wherein the switching branches comprise:
        a first switching branch coupled between the DC supply voltage node and the intermediate node, the first switching branch having a first terminal to be coupled to the first phase winding;
        a second switching branch coupled between the DC supply voltage node and the intermediate node, the second switching branch having a second terminal to be coupled to the second phase winding; and
        a third switching branch coupled between the DC supply voltage node and the intermediate node, the third switching branch having a third terminal to be coupled to the third phase winding;
    wherein the control scheme comprises a space vector pulse width modulation (SVPWM) scheme, wherein the sectors comprise six sectors, wherein the periods comprise a plurality of periods, with each of the six sectors being divided into a plurality of periods;

wherein the multi-phase AC power signal comprises a three phase AC power signal;
wherein the control circuitry applies the control signals in accordance with the SVPWM scheme to the first, second, and third switching branches to cause the inverter system to drive the first, second, and third phase windings of the electric machine with the three phase AC power signal;
wherein the first given period is the second period of at least some sectors of the SVPWM scheme;
wherein the control circuitry is configured to, during at least some sectors of the SVPWM scheme:
  during a fourth period: measure the drain to source voltage of the first calibration transistor; and measure a drain to source voltage of a measured transistor, the measured transistor being a transistor of a next switching branch;
  determine a phase current of a given phase winding coupled to the given switching branch as a function of the drain to source voltage of the first calibration transistor measured during the fourth period and the drain to source resistance of the first calibration transistor;
  determine a phase current of a next phase winding coupled to the next switching branch as a function of the drain to source voltage of the measured transistor measured during the fourth period and a drain to source resistance of the measured transistor known from a prior sector of the SVPWM scheme; and
  determine a phase current of a remaining phase winding coupled to the remaining switching branch as a function of the phase current of the given phase winding and the phase current of the next phase winding; and
wherein the control circuitry controls the driving of the first, second, and third switching branches based upon the phase current of the given phase winding, the phase current of the next phase winding, and the phase current of the remaining phase winding; and
wherein the control circuitry is further configured to:
  determine a temperature of the measured transistor during driving of the electric machine by the inverter system based upon the drain to source resistance of the measured transistor;
  modify driving of the next switching branch so as to maintain conductivity of the measured transistor at a highest level at which the temperature of the measured transistor remains below the threshold temperature; and
  cease driving of the next switching branch when the temperature of the measured transistor exceeds the threshold temperature.

8. The electric device of claim 7, wherein the first calibration transistor is a low-side transistor of the given switching branch; and wherein the measured transistor is a low-side transistor of the next switching branch.

9. The electric device of claim 7, wherein the control circuitry determines the drain to source resistance of the first calibration transistor as:

$$Rds(\text{Calibration Transistor}) = \frac{Rshunt * V1\text{phase}2}{Vshunt2}$$

where Rshunt is the resistance of the shunt resistor, V1phase2 is the drain to source voltage of the first calibration transistor measured during the second period, and Vshunt2 is the shunt voltage measured during the second period.

10. The electric device of claim 9, wherein the control circuitry determines the phase current of the given phase winding as:

$I\text{phase}1 = V1\text{phase}4/Rds(\text{Calibration Transistor})$ where V1phase4 is the drain to source voltage of the first calibration transistor measured during the fourth period, and Rds(Calibration Transistor) is the drain to source resistance of the first calibration transistor.

11. The electric device of claim 10, wherein the control circuitry determines the phase current of the next phase winding as:

$I\text{phase}2 = V2\text{phase}4/Rds(\text{Measured Transistor})$ where V2phase4 is the drain to source voltage of the measured transistor measured during the fourth period, and Rds(Measured Transistor) is the drain to source resistance of the measured transistor known from a prior SVPWM sector.

12. The electric device of claim 11, wherein the control circuitry determines the phase current of the remaining phase winding as:

$I\text{phase}3 = -(I\text{phase}1 + I\text{phase}2)$.

13. An inverter system to be coupled to three phase windings of an electric machine, the inverter system comprising:
  a first switching branch coupled between a DC supply voltage node and an intermediate node, the first switching branch having a first terminal to be coupled to a first phase winding of the electric machine;
  a second switching branch coupled between the DC supply voltage node and the intermediate node, the second switching branch having a second terminal to be coupled to a second phase winding of the electric machine;
  a third switching branch coupled between the DC supply voltage node and the intermediate node, the third switching branch having a third terminal to be coupled to a third phase winding of the electric machine;
  a shunt resistor coupled between the intermediate node and ground; and
  control circuitry configured to apply control signals in accordance with a space vector pulse width modulation (SVPWM) scheme to the first, second, and third switching branches to drive the first, second, and third phase windings of the electric machine with a three phase AC power signal;
  wherein the SVPWM scheme is divided into six sectors, with each sector being divided into a plurality of periods comprising first, second, third, and fourth periods; and
  wherein the control circuitry is configured to, during at least some sectors of the SVPWM scheme:
    during the second period of the plurality of periods:
      measure a shunt voltage across the shunt resistor; and
      measure a drain to source voltage of a first calibration transistor, the first calibration transistor being a transistor of a given switching branch,
    during the third period of the plurality of periods:
      measure a shunt voltage across the shunt resistor;
      measure a drain to source voltage of a second calibration transistor, the second calibration transistor being a transistor of a next switching branch; and measure the drain to source voltage of the first calibration transistor; and during the fourth period of the plurality of periods:
  measure the drain to source voltage of the first calibration transistor;
  measure the drain to source voltage of the second calibration transistor; and
  measure a drain to source voltage of a measured transistor, the measured transistor being a transistor of a remaining switching branch;

determine a drain to source resistance of the first calibration transistor as a function of a resistance of the shunt resistor, the drain to source voltage of the first calibration transistor measured during the second period, and the shunt voltage measured during the second period;

determine a drain to source resistance of the second calibration transistor as a function of a resistance of the shunt resistor, the drain to source resistance of the first calibration transistor, the drain to source voltage of the first calibration transistor measured during the fourth period, the drain to source voltage of the second calibration transistor measured during the fourth period, and the shunt voltage measured during the fourth period;

determine a phase current of a given phase winding coupled to the given switching branch as a function of the drain to source voltage of the first calibration transistor measured during the fourth period and the drain to source resistance of the first calibration transistor;

determine a phase current of a next phase winding coupled to the next switching branch as a function of the drain to source voltage of the second calibration transistor measured during the fourth period and the drain to source resistance of the second calibration transistor; and determine a phase current of a remaining phase winding coupled to the remaining switching branch as a function of the phase current of the given phase winding and the phase current of the next phase winding;

wherein the control circuitry is further configured to:
  control driving of the first, second, and third switching branches based upon the phase current of the given phase winding, the phase current of the next phase winding, and the phase current of the remaining phase winding;
  determine a temperature of the first calibration transistor during driving of the electric machine by the inverter system based upon the drain to source resistance of the first calibration transistor;
  modify driving of the given switching branch so as to maintain conductivity of the first calibration transistor at a highest level at which the temperature of the first calibration transistor remains below a threshold temperature;
  cease driving of the given switching branch when the temperature of the first calibration transistor exceeds the threshold temperature;
  determine a temperature of the measured transistor during driving of the electric machine by the inverter system based upon the drain to source resistance of the measured transistor;
  modify driving of the next switching branch so as to maintain conductivity of the measured transistor at a highest level at which the temperature of the measured transistor remains below the threshold temperature; and
  cease driving of the next switching branch when the temperature of the measured transistor exceeds the threshold temperature.

14. The inverter system of claim 13, wherein the control circuitry is further configured to, during a calibration phase, perform an interpolation on assumed values of the drain to source resistance of the first calibration transistor for given temperature values of the first calibration transistor to thereby generate a non-linear model of drain to source resistance to temperature for the first calibration transistor; and wherein the control circuitry determines the temperature of the first calibration transistor using the non-linear model and the drain to source resistance of the first calibration transistor.

15. The inverter system of claim 14, wherein the control circuitry is further configured to, during the calibration phase, normalize the assumed values of the drain to source resistance of the first calibration transistor prior to performing the interpolation.

16. The inverter system of claim 14, further comprising a case carrying at least the first, second, and third switching branches and the shunt resistor, with a temperature sensor being positioned within the case; and
  wherein the control circuitry is further configured to, during the calibration phase,
  read a temperature of an interior of the case from the temperature sensor;
  determine, from the assumed values of the drain to source resistance of the first calibration transistor for the given temperature values of the first calibration transistor, an expected drain to source resistance of the first calibration transistor for the read temperature;
  determine a ratio between the drain to source resistance of the first calibration transistor and the expected drain to source resistance of the first calibration transistor; and
  use the determined ratio to calibrate the assumed values of the drain to source resistance of the first calibration transistor for the given temperature values of the first calibration transistor prior to performing the interpolation such that the interpolation is performed on the calibrated assumed values of the drain to source resistance of the first calibration transistor for the given temperature values of the first calibration transistor.

17. The inverter system of claim 16, wherein the control circuitry is further configured to, during the calibration phase, normalize the assumed values of the drain to source resistance of the first calibration transistor prior to determining the expected drain to source resistance of the first calibration transistor for the read temperature.

18. The inverter system of claim 14, wherein the interpolation produces a second order non-linear model representing a relationship between drain to source resistance to temperature for the first calibration transistor.

* * * * *